US012539001B2

(12) United States Patent
Chilukuri

(10) Patent No.: US 12,539,001 B2
(45) Date of Patent: Feb. 3, 2026

(54) KITCHEN CADDY AND ACCESSORY SYSTEM AND METHODS FOR USING SAME

(71) Applicant: Krishna R. Chilukuri, Bellaire, TX (US)

(72) Inventor: Krishna R. Chilukuri, Bellaire, TX (US)

(*) Notice: Subject to any disclaimer, the term of this patent is extended or adjusted under 35 U.S.C. 154(b) by 0 days.

(21) Appl. No.: 18/806,577

(22) Filed: Aug. 15, 2024

(65) Prior Publication Data

US 2025/0221576 A1 Jul. 10, 2025

Related U.S. Application Data

(63) Continuation of application No. 17/901,848, filed on Sep. 1, 2022, now abandoned.

(51) Int. Cl.
| | |
|---|---|
| *A47J 47/20* | (2019.01) |
| *A47J 47/16* | (2006.01) |
| *F16B 1/00* | (2006.01) |
| *F16B 47/00* | (2006.01) |
| *A47K 3/00* | (2006.01) |

(52) U.S. Cl.
CPC ............ *A47J 47/20* (2013.01); *A47J 47/16* (2013.01); *F16B 1/00* (2013.01); *F16B 47/00* (2013.01); *A47K 3/001* (2013.01); *F16B 2200/83* (2023.08)

(58) Field of Classification Search
CPC .. A47J 47/20; A47J 47/16; A47J 45/02; F16B 1/00; F16B 47/00; F16B 2001/0035; F16B 47/003; A47K 3/001; A47G 29/087
See application file for complete search history.

(56) References Cited

U.S. PATENT DOCUMENTS

| | | | | |
|---|---|---|---|---|
| 2,827,651 | A | * 3/1958 | Rizk | ............ A47L 13/16 15/210.1 |
| 3,195,021 | A | 7/1965 | Martin | |
| 4,279,745 | A | * 7/1981 | Haase | ............ B03C 1/30 209/215 |
| 4,586,616 | A | 5/1986 | Cooper et al. | |

(Continued)

FOREIGN PATENT DOCUMENTS

| | | |
|---|---|---|
| DE | 29603305 U1 | 6/1997 |
| DE | 202006014393 U1 | 12/2006 |

(Continued)

OTHER PUBLICATIONS

Sidekick Sponge Assistant—Sinkology, Model #SA-MULTI-102AC, hllps://www.sinkology.com/kilchen-accessory/sinkology-sidekick-sponge-assislanl/, 3 pgs. (Retrieved: Aug. 25, 2022).

(Continued)

*Primary Examiner* — Ko H Chan
(74) *Attorney, Agent, or Firm* — Knobbe, Martens, Olson & Bear, LLP

(57) ABSTRACT

Disclosed herein are devices and systems for detachably mounting accessories, such as kitchen and bath accessories. In one aspect, a disclosed system encompasses a caddy device for detachably coupling at least one accessory; and at least one accessory configured to detachably couple to the caddy device. The caddy device may be mounted to any surface and used for detachable coupling one or more accessories, such as a kitchen sponge or brush. Also disclosed herein are kits and methods for using the disclosed devices and systems.

19 Claims, 14 Drawing Sheets

(56) References Cited

U.S. PATENT DOCUMENTS

| | | | |
|---|---|---|---|
| 4,991,268 A * | 2/1991 | Ho | B42F 15/066 |
| | | | 24/67.5 |
| 5,056,677 A | 10/1991 | Toyosawa | |
| 5,301,822 A | 4/1994 | Coleman | |
| 5,895,018 A | 4/1999 | Rielo | |
| 6,468,678 B1 | 10/2002 | Dahlin et al. | |
| 6,626,303 B1 | 9/2003 | Moodie | |
| 7,748,569 B2 | 7/2010 | Sunatori | |
| D623,048 S | 9/2010 | Moy | |
| 7,863,365 B2 | 1/2011 | Park | |
| 8,464,391 B2 * | 6/2013 | Bober | A47L 13/258 |
| | | | 15/228 |
| 8,499,943 B1 | 8/2013 | Neldner | |
| 9,395,038 B2 | 7/2016 | Crosby et al. | |
| 9,547,113 B2 | 1/2017 | Zhang et al. | |
| 9,914,615 B2 | 3/2018 | Wooldridge et al. | |
| 10,100,229 B2 | 10/2018 | Crosby et al. | |
| 10,150,892 B2 | 12/2018 | Crosby et al. | |
| 10,413,092 B2 | 9/2019 | Winnard | |
| 10,863,868 B1 | 12/2020 | Pierce | |
| 11,229,306 B2 | 1/2022 | Schmidt | |
| 11,262,790 B1 | 3/2022 | Buxton | |
| 11,523,712 B1 * | 12/2022 | Hurwicz | A47L 17/08 |
| 2003/0135181 A1 * | 7/2003 | Chen | A47L 13/20 |
| | | | 604/374 |
| 2004/0084593 A1 | 5/2004 | Barfield | |
| 2008/0146864 A1 | 6/2008 | Arai et al. | |
| 2009/0184015 A1 * | 7/2009 | Ruppert | A46B 17/02 |
| | | | 206/362.2 |
| 2009/0314730 A1 | 12/2009 | Mansikkamaa | |
| 2010/0183814 A1 * | 7/2010 | Rios | A63B 60/00 |
| | | | 427/387 |
| 2012/0132763 A1 * | 5/2012 | Robinson | A61J 9/0684 |
| | | | 248/103 |
| 2015/0122961 A1 * | 5/2015 | Batiste | A47L 13/51 |
| | | | 248/316.1 |
| 2017/0265659 A1 * | 9/2017 | Ward | A47G 1/06 |
| 2018/0338651 A1 * | 11/2018 | Burtt | A47K 3/281 |
| 2019/0203759 A1 * | 7/2019 | Zimmerman | A47L 13/16 |
| 2019/0335956 A1 * | 11/2019 | Gann | A47K 10/34 |
| 2022/0279984 A1 * | 9/2022 | Van Ert | A47B 96/06 |

FOREIGN PATENT DOCUMENTS

| | | |
|---|---|---|
| DE | 102008049794 A1 | 4/2010 |
| EP | 0981577 A1 | 3/2000 |
| EP | 3232862 A1 | 10/2017 |
| EP | 3366177 A1 | 8/2018 |
| JP | 2002353022 A | 12/2002 |
| JP | 2019058255 A | 4/2019 |
| KR | 200276866 Y1 | 5/2002 |
| KR | 200307303 Y1 | 4/2003 |
| KR | 20160136955 A | 11/2016 |
| WO | WO 9850460 A1 | 11/1998 |
| WO | WO 2016096739 A1 | 6/2016 |

OTHER PUBLICATIONS

Gupta, "Geckskin®: Unleash the Reusable Gripping Magic of the Gecko", Kickslarter, https://www.kickslarter.com/projecls/267548355/geckskin-unleash-the-reusable-gripping-magic-of-lh#, 28 pgs. Last updated: Oct. 24, 2018 (Retrieved: Aug. 25, 2022).

Hangpad™ Geckskin® device temporary holder—Geckskin®, https://www.buygeckskin.com/geckskin-producls/hangpad-geckskin-device-lemporary-holder, 3 pgs. (Retrieved: Aug. 25, 2022).

Rubber Magnetic Fashion Bracelets for sale I eBay, https://www.ebay.com/b/Rubber-Magnelic-Fashion-Bracelels/261987/bn_1998937, 24 pgs. (Retrieved: Aug. 25, 2022).

Super Ferromagnetic Silicone Putty, Eddy Currents & Magnetic Fields: Educational Innovations, Inc., https://www.teachersource.com/producl/moving-putty-display?gclid=Cj0KCQjw1ouKBhC5ARIsAHXNMI81vJ6FFWSZSFSI7qL7514Olf793ueVT3nu47..., 8 pgs. (Retrieved: Aug. 25, 2022).

4 Pcs Slim Health Silicone Magnetic Foot Toe Ring Keep Fit Slimming Lose Weight I eBay, https://www.ebay.com/tm/251977306448, 4 pgs. (Retrieved: Aug. 25, 2022).

"Magnetic" silicone ring—Google Search, https://www.google.com/search? sa= X&rlz= 1 C 1 JZAPenUS905US906&source=univ&Ibm=isch&q="magnetic"+silicone+ring&hl=en&ved=2ahUKEwiwx..., 2 pgs. (Retrieved: Aug. 25, 2022).

Magnet ring for industrial applications I Hutchinson, https://www.hulchinson.com/en/producls/magnelic-ring-industrial-applicalions, 3 pgs. (Retrieved: Aug. 25, 2022).

Magnetic silicon bracelet—magnetic wristband, magnetic bracelet, sports wristband, magnetic silicon band, magnet embedded wrist bracelet, Neomax30, www.neomax30.com/magnelic_silicon_bracelel.hlml, 2 pgs. (Retrieved: Aug. 25, 2022).

Rotary encoder—Wikipedia, hllps://en.wikipedia.org/wiki/Rotary_encoder, 9 pgs. {Retrieved: Aug. 25, 2022).

* cited by examiner

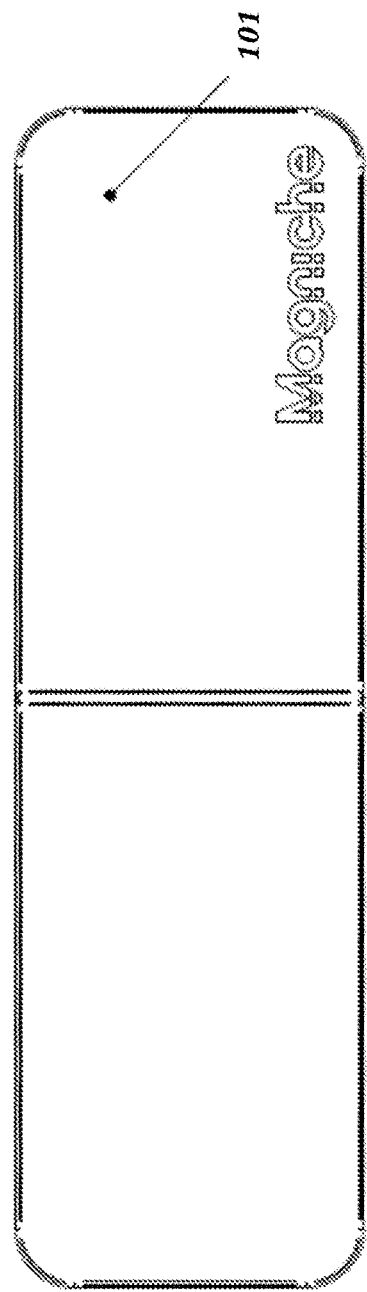
*FIG. 1A*
*FIG. 1B*
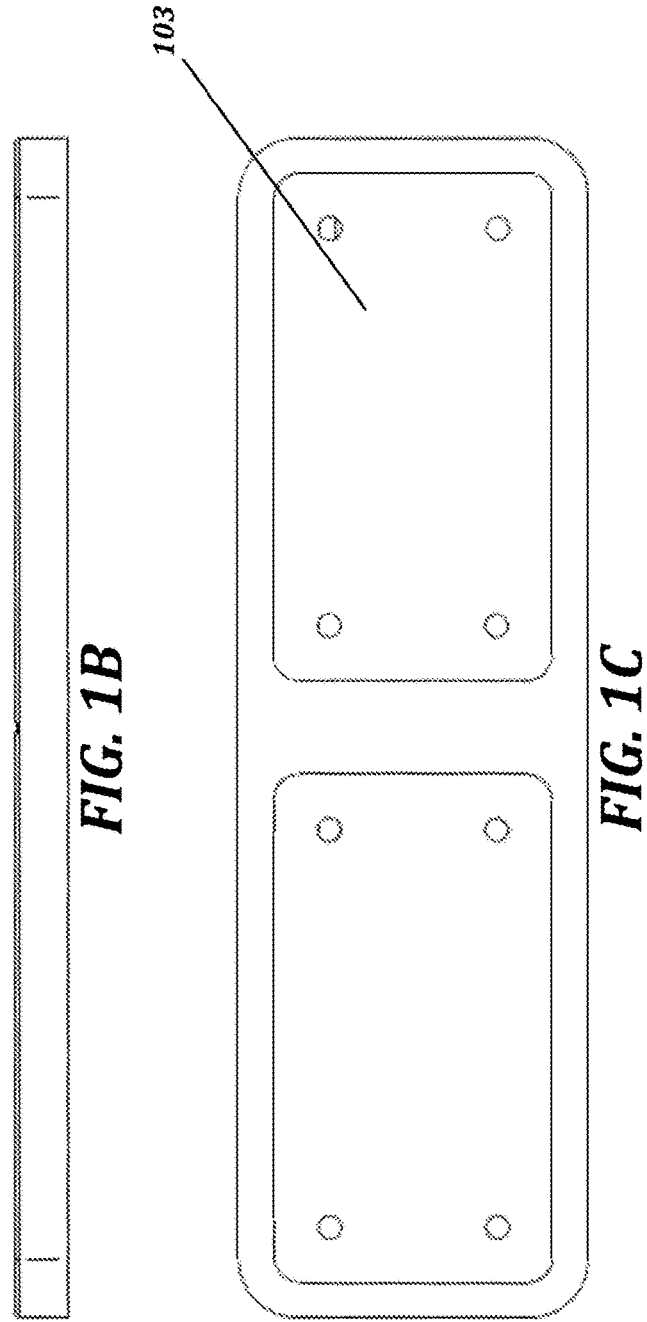
*FIG. 1C*

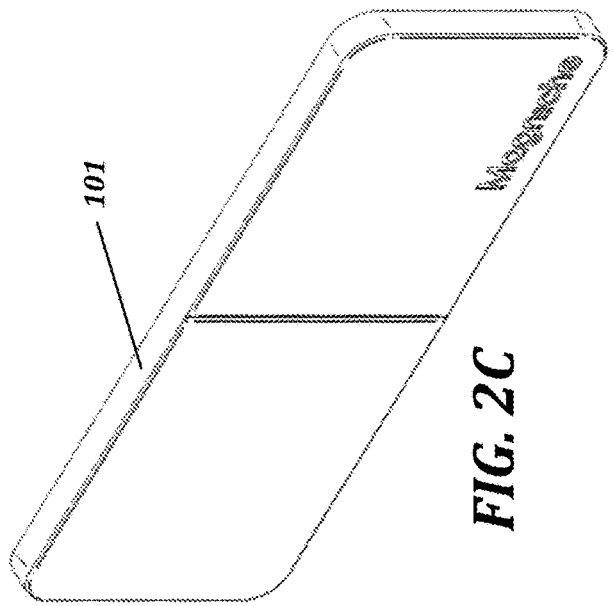
FIG. 2C
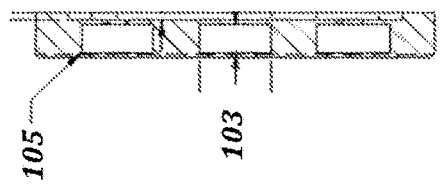
FIG. 2B
*(Section A-A)*
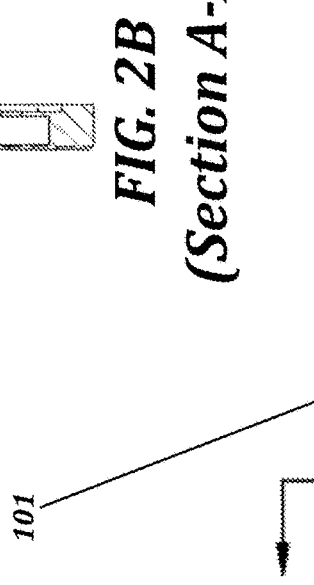
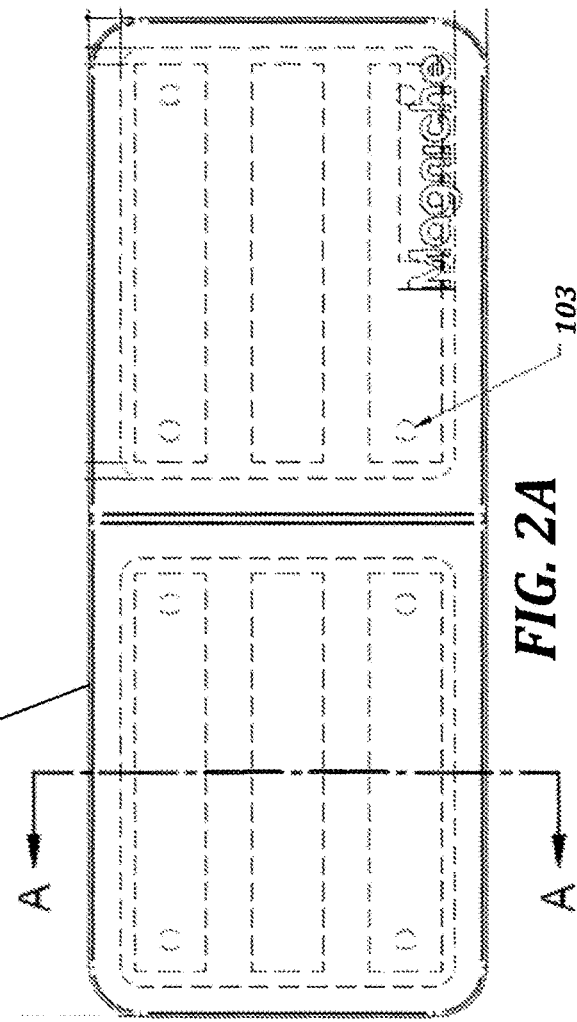
FIG. 2A

*FIG. 3A*  *FIG. 3B*

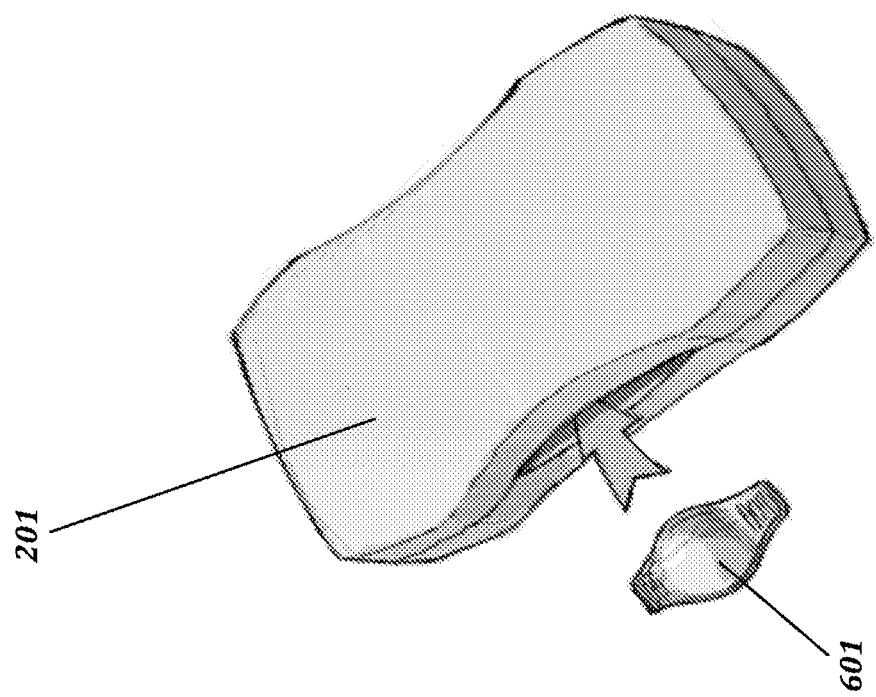
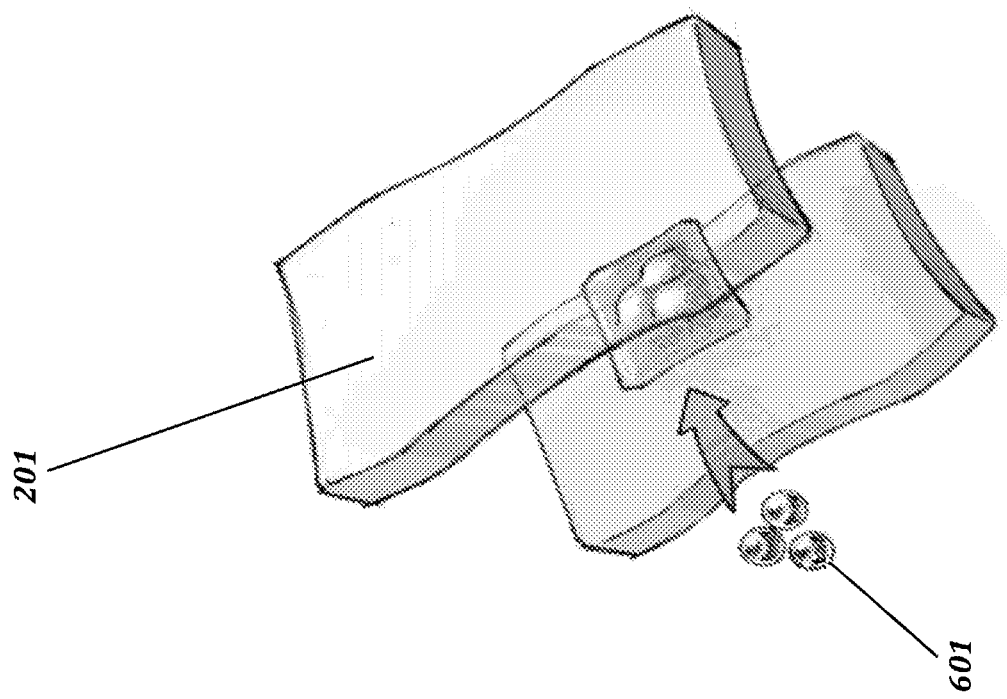
FIG. 13

KITCHEN CADDY AND ACCESSORY SYSTEM AND METHODS FOR USING SAME

RELATED APPLICATION

This application is a continuation of U.S. patent application Ser. No. 17/901,848, filed Sep. 1, 2022, entitled KITCHEN CADDY AND ACCESSORY SYSTEM AND METHODS FOR USING SAME, which claims the benefit of U.S. Provisional Patent Application No. 62/239,520 filed Sep. 1, 2021, entitled KITCHEN CADDY AND ACCESSORY SYSTEM AND METHODS FOR USING SAME, the disclosures of which are incorporated herein by reference in their entirety. Any and all applications for which a foreign or domestic priority claims is identified in the Application Data Sheet as filed with the present application are hereby incorporated by reference under 37 C.F.C. § 1.57.

FIELD OF THE INVENTION

The present invention relates to apparatuses, devices, caddies, systems, platforms, and methods for detachably mounting and attaching kitchen and bath accessories and caddy devices.

BACKGROUND OF THE INVENTION

In some situations, storing kitchen devices and accessories can take up a significant amount of otherwise useable workspace. For example, if the devices and accessories are unable to easily mount to the surrounding surface, it may require irreversible changes being made to the surrounding surface to allow for the devices and accessories to be properly used in that environment. Further, even if the devices and accessories are able to easily used within their current environment, proper storage can lack the ability to be permanent and resist degradation over a long period of time. Thus, the conventional strategy is to utilize some combination of semi-permanent attachment mechanism (e.g., suction cups) to attach the devices and accessories being used. This often causes problems because the conventional strategy does not permanently or sufficiently attach to the surrounding environment, does not utilize the minimum amount of space within the working environment (i.e., sink wall or other vertical surface), and does not provide a sufficiently effective means for sink devices and related accessories to attach to these surrounding surfaces. For example, conventional kitchen devices and accessories rely on physical mounting means such as hooks or suction cups to attach directly to the surrounding surface. This is ineffective as a long-term solution as it requires a weaker attachment interaction directly with the surrounding surface, whether that surface is capable of permanently bonding with the devices and accessories or otherwise.

Accordingly, there remains a need for improved bath and kitchen caddy systems, devices and detachable accessories. This need and other needs are met by various aspects of the present invention.

SUMMARY OF THE INVENTION

In accordance with the purposes of the invention, as embodied and broadly described herein, the invention, in one aspect, relates to apparatuses, devices, systems, platforms, and methods for mounting and attaching caddy devices and detachable accessories, such as detachable sponges, brushes, and related sink accessories.

In one aspect, the present disclosure relates to a detachable accessory system comprising an accessory caddy device for detachably coupling at least one accessory and at least one accessory configured to detachably couple to a caddy device. In another aspect the present disclosure provides an accessory caddy device comprising a caddy device assembly and a mounting mechanism for attaching the accessory caddy device to a mounting surface and a coupling mechanism for detachably attaching the accessories, such as sink, kitchen, and or bath accessories, to the accessory caddy device.

In further aspects, the caddy device assembly can be capable of being vertically mounted. The caddy device can be constructed from a plurality of materials that may not degrade over time due to exposure to the environment in which the device is being used. Construction of the device may include materials such as, but not limited to, silicone, plastic, antimicrobial material, or a film. Additionally, the caddy device can have attachment points for the accessory devices comprising attachment properties that may not be present in the surrounding surface.

In other aspects, the present disclosure provides an accessory configured to detachably attach to vertical surface, such as, for example, a magnetic mounting surface. A caddy device may comprise or otherwise incorporate the magnetic mounting surface that the accessories can attach to. In further aspects, the accessory device that can attach to the caddy device can be a tool or a support for other tools that could not otherwise be able to attach to the caddy device or surrounding surfaces, or the accessory itself can be used to hold other tools not inherently able to attach to the caddy device. In some embodiments, the accessory can comprise a magnetic sponge or brush.

In still further aspects, the present disclosure relates to methods for using and making the disclosed apparatuses, devices, systems, platforms, and accessories.

BRIEF DESCRIPTION OF THE DRAWINGS

The accompanying drawings, which are incorporated in and constitute a part of this disclosure, illustrate several aspects of the invention and together with the description, serve to explain the principles of the invention. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIGS. 1A-1C show depictions of a caddy device base station m accordance with an embodiment of the present invention.

FIGS. 2A-2C show depictions of a caddy device base station m accordance with an embodiment of the present invention.

FIGS. 3A-3B show various view of detachable sponges for use with a caddy device base station in accordance with an embodiment of the present invention.

FIG. 13 show depictions of an accessory device with a removeable magnetic pouch for securely mounting the accessory device to the caddy device in accordance with an embodiment of the present disclosure.

DETAILED DESCRIPTION OF THE PREFERRED EMBODIMENT

Figure 4:
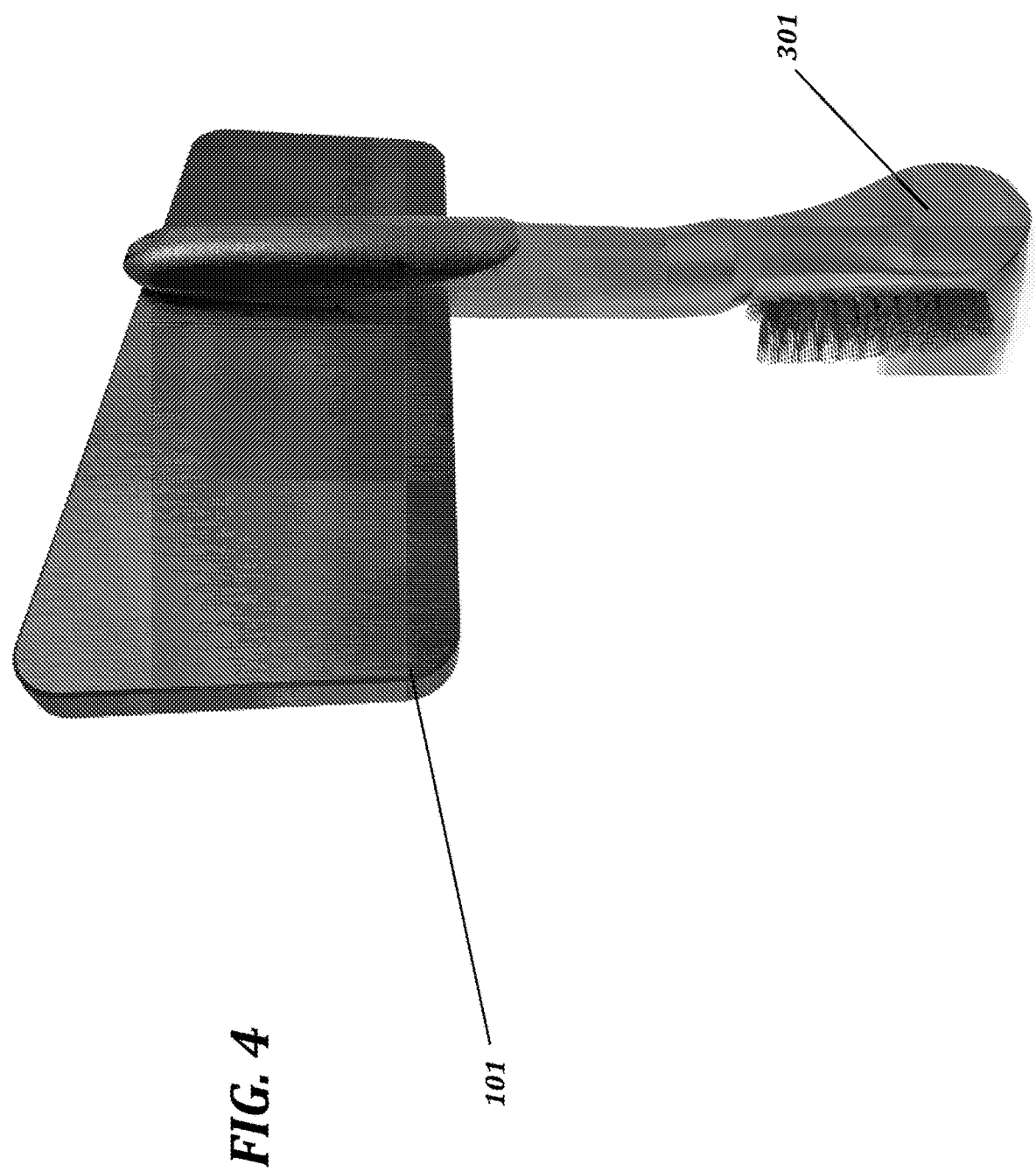
FIG. 4 shows a view of a system comprising a detachable brush with a caddy device base station in accordance with an embodiment of the present invention.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "a leg" includes two or more legs.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about' and "at or about" mean that the amount or value in question can be the value designated some other value approximately or about the same. It is generally understood, as used herein, that it is the nominal value indicated ±10% variation unless otherwise indicated or inferred. The term is intended to convey those similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the materials, components, parts, and/or elements to be used to manufacture the disclosed devices and systems of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result. The invention of present disclosure may be referred to herein as a device, apparatus, system, platform, accessory, caddy, and method for securely mounting a caddy and accessory system to any surface.

B. Caddy Device and System Overview

As briefly described above, the present disclosure provides, in various aspects, devices and systems for securely mounting caddies and detachable accessories, such as kitchen and bath accessories and the like. In further aspects, the disclosed devices and systems may be useful for the efficient use of space in a work environment and containerization of tools in a way that does not interfere with activities would otherwise take place in the environment. This brief summary is provided to introduce a selection of concepts in a simplified form that are further described below. This brief overview is not intended to identify key features or essential features of the claimed subject matter. Nor is this brief overview intended to be used to limit the claimed subject matter's scope.

This overview is provided to introduce a selection of concepts in a simplified form that are further described below. This overview is not intended to identify key features or essential features of the claimed subject matter. Nor is this overview intended to be used to limit the claimed subject matter's scope.

In one aspect, the present disclosure provides a detachable accessory system comprising a caddy device for detachably coupling at least one accessory configured to detachably couple to the caddy device. In another aspect the present disclosure provides a caddy device for accessories comprising a caddy device assembly and a mounting mechanism for attaching caddy device to a mounting surface and a coupling mechanism to detachably attach or secure one or more accessories to the caddy device.

In another aspect, the disclosure provides one or more detachable accessories configured to attach to a magnetic mounting surface. The magnetic mounting surface may be incorporated into a caddy device that the accessories can attach to. The accessory device that can attach to the caddy device can be a tool or a support for other tools that could not otherwise be attached to the caddy device, or the accessory itself can be used to hold other tools not inherently able to attach to the caddy device, in some embodiments the accessory devices can comprise a magnetic sponge or brush.

In further aspects of the present disclosure the caddy device assembly can be capable of being vertically mounted. The caddy device can be constructed from a plurality of materials that may not degrade over time due to exposure to the environment in which the device is being used. Construction of the device may include materials such as, but not limited to, silicone, plastic, antimicrobial material, or a film. Additionally, the caddy device can have attachment points for the accessory devices comprising attachment properties that may not be present in the surrounding surface.

According to various aspects the caddy device is not brittle and capable of bending without the device breaking or any internal attachment mechanisms breaking through the exterior of the device. In other aspects the attachment mechanisms themselves can also be not brittle and can be capable of bending to a comparable degree of the surrounding material without puncturing or damaging the material.

According to various aspects the caddy device may also comprise an attachment mechanism for the accessories. The attachment mechanism may be able to support the weight of the accessory, regardless of if the attachment mechanism may be internally or externally incorporated into the caddy device. The attachment mechanism can be distributed throughout or substantially throughout the caddy device or may be located only in finite area of the caddy device. To attach accessories to the caddy device the attachment mechanism can use a plurality of means such as, but not limited to, magnetic force, adhesive means, or even the same type of mechanism used to attach the caddy device to the surrounding surface.

According to various embodiments of the present disclosure the caddy device may further comprise concavities for the placement of the accessory devices. The concavities can correspond to the attachment mechanism of the accessory and may allow for the system to take up less space overall, as well as potentially allowing for easier attachment of the accessories to the caddy device.

According to various embodiments the caddy device can be utilized with a plurality of attachment mechanisms. The plurality of attachment mechanisms can be paired with the caddy device, the attachment mechanism selected from the plurality of attachment mechanisms may be better suited for the specific environment or accessories that are to be used with the caddy device.

According to various embodiments, at least one face of the device comprising the attachment mechanism. The face of the device comprising the attachment mechanism may be an integral part of the device. Additionally, the at least one face having the attachment mechanism allows for the replacement of the attachment mechanism used in the device.

In various embodiments the attachment mechanism may be embedded within the caddy device. The embedded attachment mechanism may not interfere with the hinder the ability for the accessory devices to attach to the caddy device, additionally with the attachment mechanism embedded within the caddy device the attachment mechanism can be shielded from the surrounding environment.

According to various embodiments of the present invention the accessory may further comprise a mounting mechanism to attach the device to a mounting surface. The mounting surface may be a horizontal surface that the mounting mechanism can bond with using physical means. In other embodiments of the present disclosure the mounting surface many comprise a vertical surface or be a material that may make up a wall or a sink. To bond to these surfaces the mounting mechanism may comprise a designer suction cup, microsuction tape, GECKSKIN®, removeable VHB® tape, Dual-lock tape, a magnetic anchor, Tacky vacuum membrane, thin film, or plastic-like thin film. Accordingly in various embodiments the mounting mechanism of the device is stronger than the attachment mechanism of the accessory.

In various embodiments consistent with the present disclosure the mounting mechanism may be horizontal mounting mechanism. The horizontal mounting mechanism may prevent the device from sliding along the horizontal surface due to bonding with the surface rather than high coefficient of friction. Additionally, the horizontal mounting mechanism may be integrated into the design of the device, and additionally may maintain its bonding properties when the device is used on a vertical mounting surface, and the mounting mechanism can remain reusable after repeated use without significant loss to bonding capabilities.

In some embodiments, the device or system may alternatively or additionally comprise a magnetic surface treatment or component configured for adhering to a mounting surface for attaching the caddy device. In further aspects, the magnetic surface treatment may comprise magnetic properties effective to allow the caddy device to releasably couple thereto, for example, without the need for the caddy device to have an adhesive or mounting mechanism. The magnetic surface treatment may be a magnetic film, coating, covering or tape, or the like. In still further aspects, the external surface of the magnetic surface treatment may be non-abrasive, non-skid, or waterproof, resistant to oxidation, or a combination thereof.

According to various embodiments consistent with the present disclosure the caddy device may further comprise a vertical mounting mechanism. The vertical mounting mechanism can support the weight of any accessories attached to the caddy device. Additionally, the vertical mounting mechanism may retain its mounting properties if it is used in different orientations. According to various further embodiments, the detachable accessory may be a kitchen accessory, bathroom accessory, or garage accessory. Further the accessory can be configured to have an attachment mechanism capable of detachably attaching to the caddy device or a mounting surface.

In various aspects, detachable accessories of the present invention may be configured to attach directly to a mounting surface, such as the caddy device or sink surface. The accessory may cooperate with the same attachment mechanism of the caddy device for the mounting. In further aspects, the accessory coupling mechanism can include a magnetic coupling mechanism. The coupling mechanism, in various further embodiments, may be distributed throughout or substantially throughout the accessory and has the ability to be embedded within the accessory. The coupling mechanism of the accessory can be configured to attach to surfaces other than the caddy device and can create a strong enough attachment to support the entire weight of the accessory to the point that the accessory device can be configured to directly mount to a surface. In still further embodiments, the strength of the coupling mechanism does not attach to any surface while the accessory is in use.

According to various embodiments, the coupling mechanism may be configured to repeatedly attach to the coupling surface, even if the coupling mechanism may be embedded within the accessory device. In further embodiments, the coupling mechanism may be a magnetic coupling mechanism. Further the coupling mechanism can be distributed throughout or substantially throughout the accessory device.

In further aspects, the accessory device may have a component that corresponds to the caddy device for coupling. Additionally, the coupling mechanism may be able to repeatedly couple to the device without losing coupling ability. In various embodiments, the coupling mechanism may be embedded internally or mounted externally to the accessory. The accessory device may be configured to couple to the caddy device more effectively than compared to the surrounding surface.

In further aspects, the accessory may be a sponge. The sponge accessory may be inherently magnetic or have the ability for a magnet to be inserted into the sponge. Internally, the sponge may have an internal liner to shield the magnets from the environment or the magnets in themselves may be sealed so if they are inserted into the sponge, they will not degrade overtime. The sponge additionally may be configured to allow for the magnetic coupling mechanism to be removed from the sponge.

According to various embodiments of the present invention the accessory may further comprise a brush. The brush may be configured to couple to a surface or device in such a way that no moment arm of the brush exceeds the attachment strength of the brush to the device. Other embodiments of the present disclosure include accessories that can have additional tools attach to the accessory that would otherwise be unable to attach to the device. For example, this accessory may be a soap dish, a tray, or a hook. In various embodiments the accessory may have improved functionality as a result of being able to couple with the caddy device. For example, and without limitation, the accessory may be more sanitary than conventional accessories since the device can promote airflow or drainage of the accessory.

According to various embodiments the device may further comprise a reusable mounting mechanism. The reusable mounting mechanism may not lose any significant amount of adhesion from prolonged use of the mechanism, and the mechanism can be able to repeatedly attach and detach from the mounting surface. Additionally, the mounting mechanism may be compact in design to not interfere with the normal activities that take place in the environment that the device is placed in.

In various embodiments of the present disclosure the device may comprise a removeable mounting mechanism. For instance, the mounting mechanism may be removed for cleaning, and being removeable, the mounting mechanism may therefore also be removed to allow for easier mounting. Additionally, the mounting mechanism may be removeable from the device so that it can be replaced.

In various embodiments of the present disclosure the device may have a water-resistant exterior. The device may have an external coating that makes it more resistant to water, or the material used in the construction of the device is intrinsically water-resistant.

In various embodiments of the present disclosure the device may have anti-microbial properties. The device can comprise or otherwise have an anti-microbial coating, anti-microbial materials, or the anti-microbial properties may be wholly integrated into the device. The device may also utilize an anti-microbial coating that acts as an external barrier for the device. In some embodiments, the anti-microbial material may comprise copper.

In various embodiments of the present disclosure the device may comprise a magnetic attachment mechanism. The magnet may be a rare-earth magnet, a thin ferrous material, a magnetic ceramic, or a magnetic material that is resistant to oxidation.

According to various further embodiments of the present disclosure, a device or accessory of the present invention comprises a casing or housing or handle or the like, which may be shaped to conform to the contour of a flat surface, such as, for example, a surface of a sink. In further aspects, the shaped casing or housing may have an established shape, for example, by a preformed casing, or may be a moldable or foldable casing. In still further aspects, a housing may be flat in shape on at least its proximal side (i.e., side facing or contacting the sink surface) so that the contact area is shaped so that all or substantially all of the proximal side or rear face of the housing contacts or is otherwise disposed on the adjacent surface. All or a portion of a housing may be flat. Additionally, in other embodiments, a proximal side and/or a distal side of the casing may be flat or planar, and the lateral sides of the casing may be shaped. In still further aspects, the lateral sides of the housing may be shaped in any form desired. The housing can be any shape, and preferably is in the shape of a three-dimensional polygon and the housing walls define an interior space or interior sections for containing the mounting mechanism and/or certain operating elements of the invention. Any other shape (as used herein, the term shape is used in the broad sense of three-dimensional works) may be employed, so long as the shape is large enough and structured so as to be able to contain the various components of the invention as more fully disclosed below.

In further embodiments, the housing may be constructed such that housing can contain and hold components in a predetermined position relative to an opening on the housing. In further aspects, some or all of the device components can be housed within the housing such that they are protected from, for example, the environmental elements, such as water intrusion. In even further aspects, the housing can be comprised of plastic, plastic composite, reinforced plastic, metal, metal composite, or combinations thereof. In still further aspects, the plastic can comprise silicone, polypropylene, impact resistant plastic, or the like. In some aspects, the housing may comprise a plastic housing. In other aspects, the housing may comprise a metal housing. The housing may be a planar plate that is molded or folded to allowing for ease of inserting and removing a component. In some embodiments, the casing may comprise an elastic thermoplastic, such as thermoplastic polyurethane (TPU), or a hard plastic material. In other embodiments, the casing may comprise both an elastic thermoplastic, such as thermoplastic polyurethane (TPU), and a hard plastic material. For example, the casing may comprise a hard outer shell portion and a softer TPU inner portion, which may be the portion configured to attached to the sink surface.

In further embodiments, the casing or housing may comprise at least one stabilizing or securing component for securely positioning the components within or on the casing or housing. The stabilizing or securing component can comprise removable material or a clip, cam gripping element, locking mechanism, or other mechanical component for various elements in a fixed position within the casing or housing. In further aspects, the stabilizing or securing component may be positioned within the casing or housing such that when an accessory is positioned on or near it, the stabilizing or securing component securely holds the accessory in position. In some aspects, the casing or housing may comprise internal spaces or grooves for receiving stabilizing or securing component of various sizes, such as magnets and the like. To this end, the user may select the appropriate magnet size to match the accessory to securely maintain the accessory position against the corresponding surface.

In further embodiments, the housing comprises at least one fastener space or post for receiving a fastener, or connecting or attachment means. In still further aspects, the housing can comprise a plurality of fastener posts for receiving fasteners and/or a connecting means or attachment means. In further embodiments, the housing and/or device assembly may further comprise a stabilizing area comprising an anti-slip material on a portion or substantially all of designated surfaces of the housing and/or device assembly, such as those that may contact a mounting surface. In still further aspects, a stabilizing area may be found on the proximal (or rear side) of the housing and may cover a portion or substantially all of an area on the proximal side that corresponds to the surface adjacent to the mounting surface. In yet further aspects, housing may further comprise a non-abrasive material on a portion or substantially all of the distal (i.e., top) and lateral (i.e., side) sides of the housing.

In further aspects, various embodiments of the invention may be weatherproof or configured to limit introduction of environmental elements into the housing. For example, the device may comprise a clear protective film allow interaction while providing protecting from the elements. In still further aspects, the housing or casing may comprise a permeable barrier material which allows air, sound, vapor, magnetic energy, and electrical signals to pass through, but prevents water and liquids from passing through.

In various embodiments, the components of the disclosed devices and components can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In yet further aspects, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like. In still further aspects, the device and system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof.

In various aspects, the device component characteristics and configuration, such as, for example, size and dimensions, can be configured to adjust for sizes and uses and other factors to achieve optimal operating parameters. In further aspects, features of the device and components may be configured or utilized to set and/or control the characteristics. For example, at least one of the following may be configured: the type of material used for the casing and housing; the dimensions (e.g., height, width, thickness, surface-mounting material and area, magnet type, etc.); the flexibility or tensile properties of the caddy, casing or device assembly; and the like.

According to various embodiments of the disclosure, the devices and systems of the present invention provides a number of advantages over current options. The combination of inventive configurations, device construction and positioning allow the disclosed devices and systems to be more effective in detachably securing kitchen and bath accessories. According to various embodiments, the present invention provides an efficient, removable caddy device for detachably attaching accessories, which among other features, does not require a permanent change to the sink or mounting surface, and allows the user to easily unmount the device caddy to take with them when traveling or changing residences. In some embodiments, the caddy device can be configured to attach to the outside wall of the sink and be effective to allow the accessories to be removably attached directly to the corresponding portion of the inside sink wall.

In another aspect, the disclosure provides a device attachment mechanism configured to detachably connect to a plurality of objects. The device can be a ring, ellipse, circle, or other shape that easily attach to a plurality of objects such as kitchen accessories or other hand tools. The device may enable a temporary attachment to a first attachment surface that would not attach to the object detachably connected to the mechanism.

In further aspects of the present disclosure the configurable mounting system can be made of an elastic material. The system may be constructed using a silicone, rubber, plastic, or other nonreactive materials that can change shape without damaging the material. In some embodiments the material may further comprise anti-bacterial or anti-fungal properties to prevent germs and mold from accumulating on the system. The material used to construct the system may enable the system to change shape such that it may encompass at least a portion of an object.

Other embodiments of the present disclosure enable a system that may attach to an object. As such, the device may change shape to fit onto at least some portion of the object such that as the system attempts to return to the original shape of the system, it will become attached to the object. The attachment may be mechanical, chemical, or physical to the object. Some embodiments may use a high coefficient of friction to attach the system to the object as a result of the object attempting to return to its original shape due to elastic properties of the material. In other embodiments, the material of the system may provide a magnetic attachment to the object.

Further, various embodiments of the disclosure enable the system to detachably connect to the object. For example, the system may have changed shape to attach to at least a portion of the object. To detach the system from the object according to some embodiments of the present disclosure the system may disfigure a second time such that it can be removed from the object. When the object can be removed from the system, the system can be configured to return to its original shape.

Further aspects of the system allow it to detachably connect with an attachment surface. In some embodiments of the present disclosure, the system may be configured to detachably connect to a caddy device. Other embodiments of the present disclosure also enable the system to utilize the caddy attachment mechanism to attach to other attachment surfaces. The attachment surfaces can comprise, tile, metal, ceramics, laminate, wood, or other materials commonly found in a kitchen, workshop, bathroom, or other environment that requires storage for specialized tools. Some embodiments of the system may be configured to detachably connect to a sink. Accordingly, the system may retain its ability to detachably connect to an attachment surface without diminishing over a substantial period of time. As such, the system enables an object to be repeatedly detachably coupled to an attachment surface.

Various aspects of this system may use a plurality of caddy attachment mechanism to attach to the attachment surface. For example, the system may magnetically attach to an attachment surfacing using a caddy attachment mechanism embedded within the system. In other embodiments, the system may utilize a caddy attachment mechanism that enables the system to physically, adhesively, chemically, or otherwise maintain contact with the attachment surface when under a load.

Embodiments of the present disclosure may allow for the system to support the weight of the object attached to the system when the system is attached to the surface. Accordingly, the system can connect with the attachment surface to support the weight of the object attached to the system from any direction. In some embodiments only part of the system will need to be connected to the attachment surface to support the weight of the connected object. Accordingly, the caddy attachment mechanism comprises a mechanism that has a total attachment force larger than In some embodiments, the present disclosure may include a configurable mounting system comprising a device attachment mechanism and a caddy attachment mechanism. The caddy attachment mechanism may be embedded within the construction of the system, inserted into the system such that it can be removeable, or distributed throughout the system. For example, the caddy attachment mechanism may comprise magnetic particles that distributed throughout the device attachment mechanism such that the entire system can be embedded throughout the entirety of the system.

C. Device and System Configuration

According to various embodiments of the invention, the devices and systems of the present disclosure can comprise multiple configurations. FIGS. 1-14 illustrate non-limiting examples of embodiments of operating environments, mechanisms, and components for the disclosed devices and systems. Although the operating environments, mechanisms, and components are disclosed with specific functionality, it should be understood that functionality may be shared between mechanisms and/or components, with some functions split between mechanisms and/or components, while other functions duplicated by the mechanisms and/or components. Furthermore, the name of the mechanisms and/or components should not be construed as limiting upon the functionality of the mechanisms and/or components. Moreover, each stage in the claim language can be considered independently without the context of the other stages. Each stage may contain language defined in other portions of this specifications. Each stage disclosed for one mechanism and/or component may be mixed with the operational stages of another mechanism and/or component. Each stage can be claimed on its own and/or interchangeably with other stages of other mechanisms and/or components.

FIGS. 1A-2C show various view of a caddy device base station 101 in accordance with an embodiment of the present invention. FIGS. 3A-3B show various view of detachable sponges 201 for use with a caddy device base station in accordance with an embodiment of the present invention.

Figure 5:
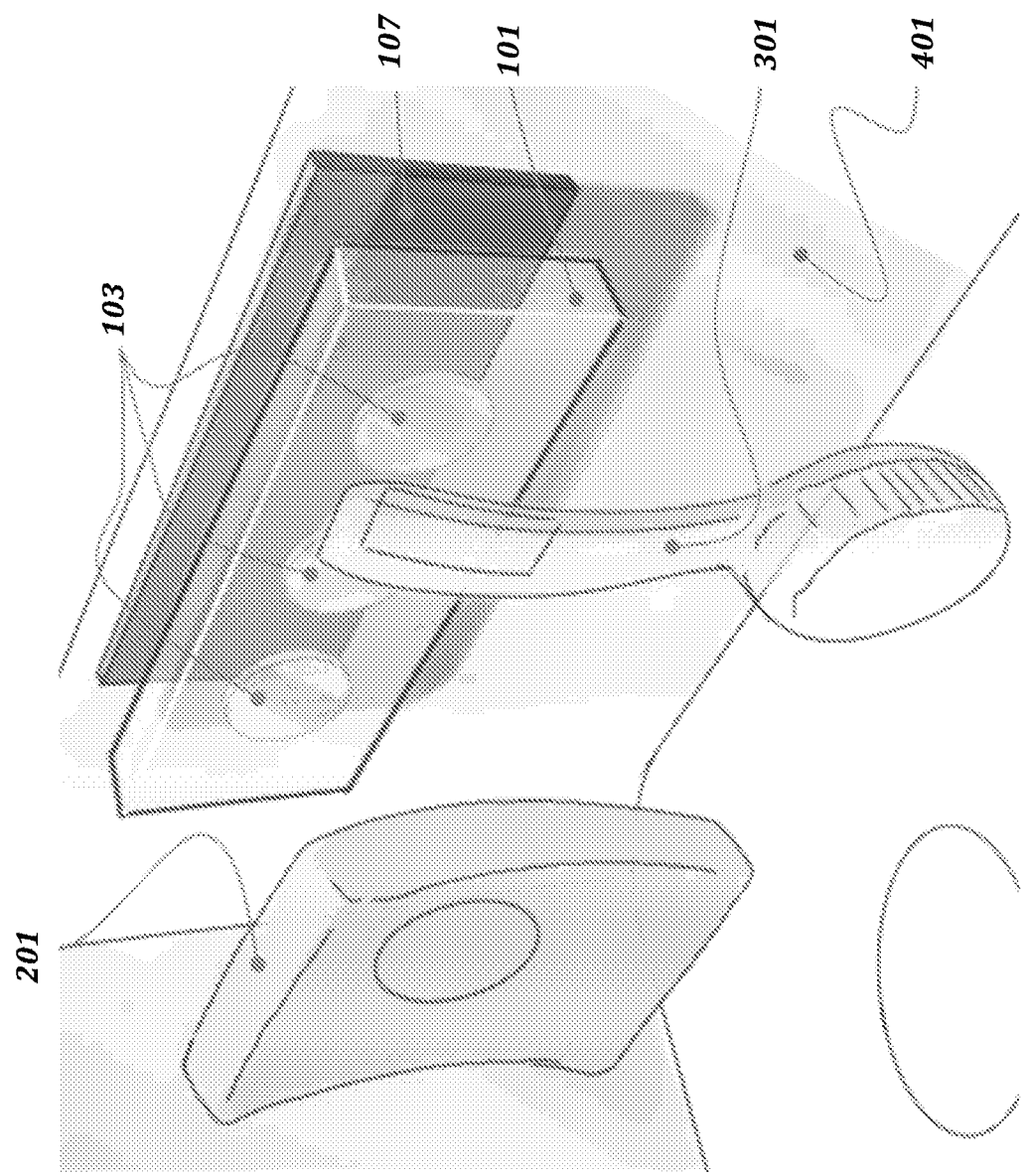
FIG. 5 show depictions of a device for securely mounting a caddy device to a sink wall and potential embodiments of a sponge and brush accessory configured to attach to the device in accordance with an embodiment of the present disclosure.

FIG. 4 shows a view of a system comprising a detachable brush 301 with a caddy device base station 101 in accordance with an embodiment of the present invention. FIG. 5 shows another embodiment of the system. In various aspects, the mounting mechanism 107 is a thin magnet adhered to the mounting surface 401 that the caddy 101 can be configured to bond with the mounting mechanism. The caddy 101 can be made from a plurality of materials that can have neodymium or other rare-earth magnets embedded within the caddy to act as attachment mechanisms 103 for the caddy device. The accessories 201, 301 can be configured to have embedded within them a thin steel magnetic coupling mechanism that can be configured to bond to the attachment mechanism of the caddy device in accordance with the present invention.

Figure 6:
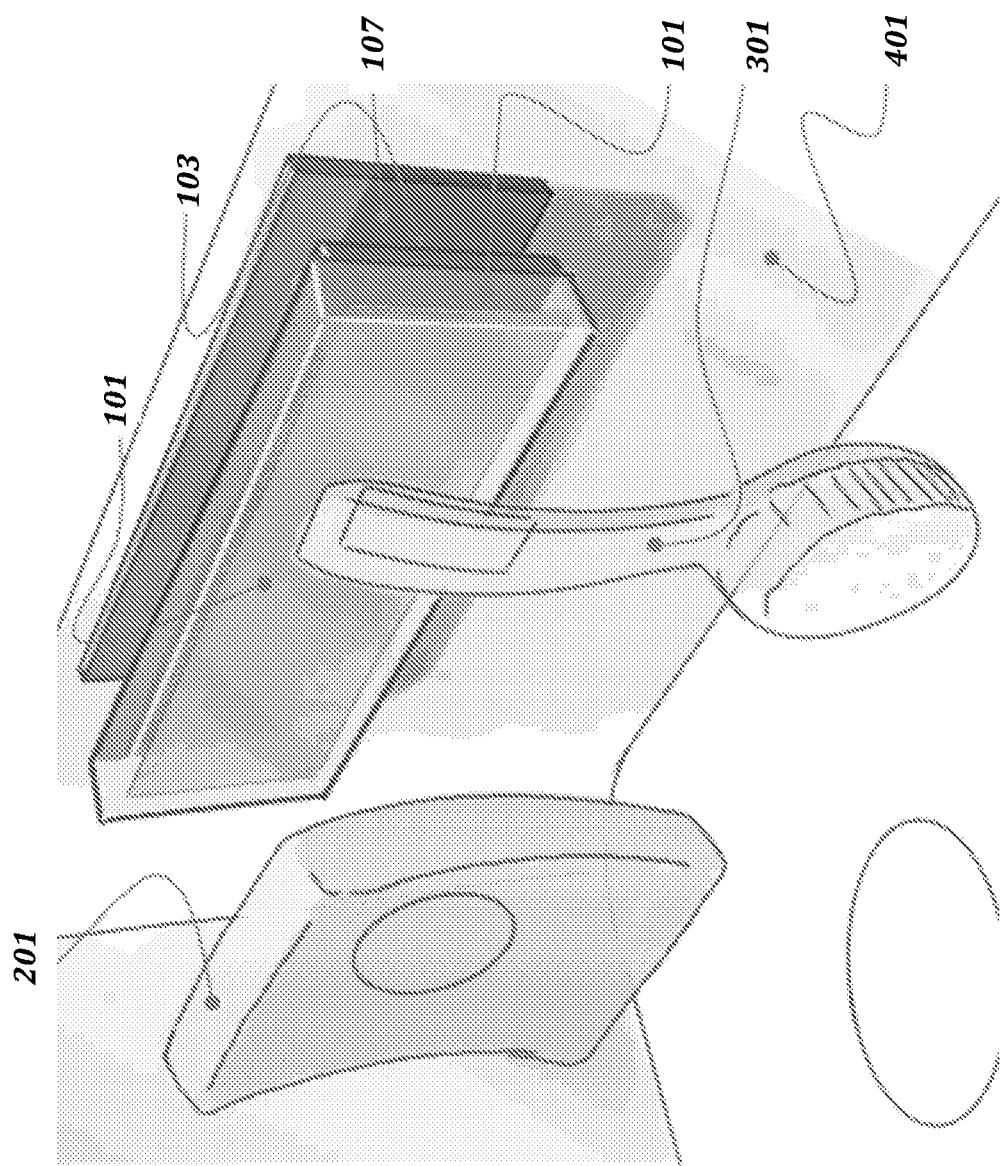
FIG. 6 shows a depiction of a device for securing a caddy device and an accessory to a sink wall where the attachment mechanism of the caddy device is distributed substantially throughout the entirety of the device in accordance with an embodiment of the present disclosure.

FIG. 6 shows another embodiment of the invention of the present disclosure. In this embodiment the caddy device 101 can utilize a plurality of magnets to bond the caddy device to the mounting mechanism 107. Further, the caddy device 101 can be embedded with a thin steel plate substantially throughout the device to act as an attachment mechanism 103 for accessories 201, 301 to bond to. The accessories can be embedded with rare-earth magnets (e.g., neodymium) to act as a coupling mechanism to bond with the caddy device 101. In some embodiments of the invention the magnetic coupling mechanism can be removed from the accessory and reused in other accessories.

Figure 7:
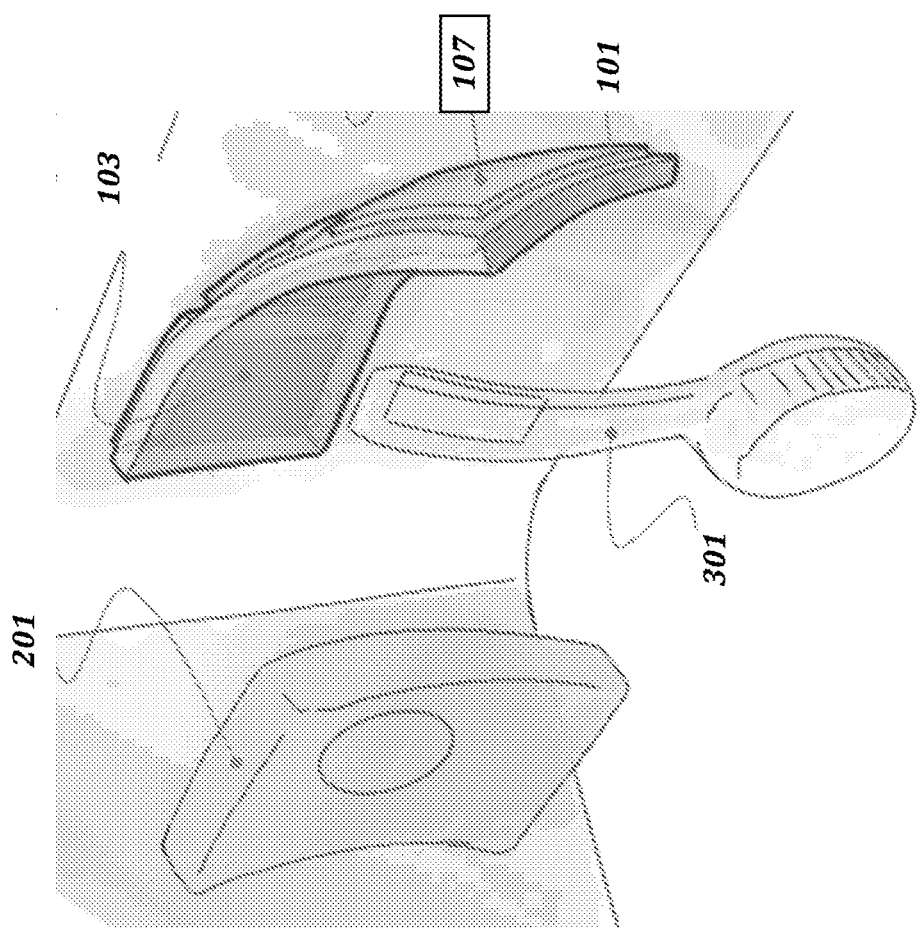
FIG. 7 shows a depiction of a device for securing a caddy device and an accessory to a sink wall where the mounting mechanism is a plurality of adhesive pads in accordance with an embodiment of the present disclosure.

FIG. 7 depicts yet another embodiment of the present disclosure. In this embodiment the mounting mechanism 107 of the caddy device 101 is a plurality of adhesive pads capable of bonding the caddy device to a mounting surface. Due to the flexible nature of the material used in construction of the caddy device 101 (e.g., silicone, plastic, thermoplastic polyurethane) the attachment mechanism 103 of the device is a plurality of embedded thin steel plates that allow the caddy device 101 to bend without immediately breaking.

Figure 8:
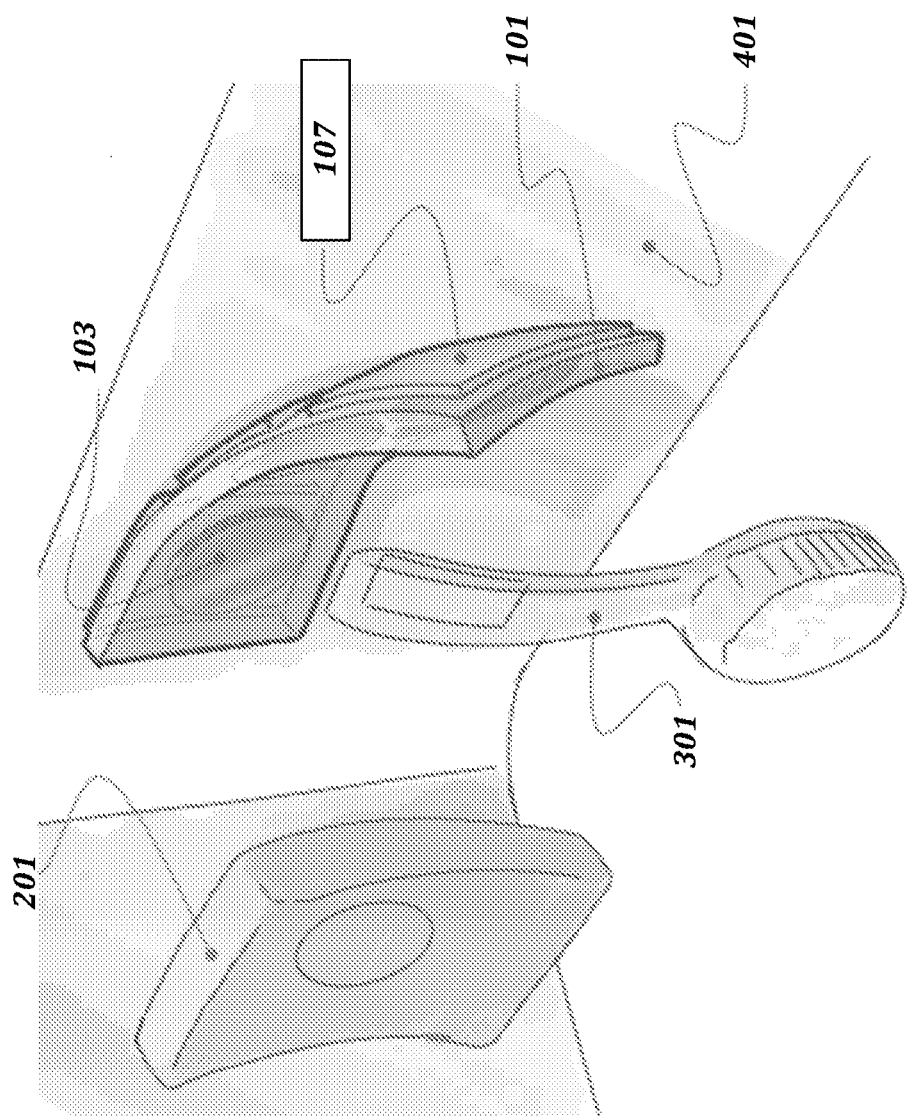
FIG. 8 shows a depiction of a device for securing a caddy device and an accessory to a sink wall where the attachment mechanism is a plurality steel plates in accordance with an embodiment of the present disclosure.

FIG. 8 shows another embodiment of the present disclosure. In this embodiment the present disclosure can utilize a plurality of neodymium magnets as the attachment mechanism 103 embedded within the caddy device while the accessories 201, 301 are embedded with thin steel plates as the coupling mechanism for the accessories to attach to the caddy device 101.

Figure 9:
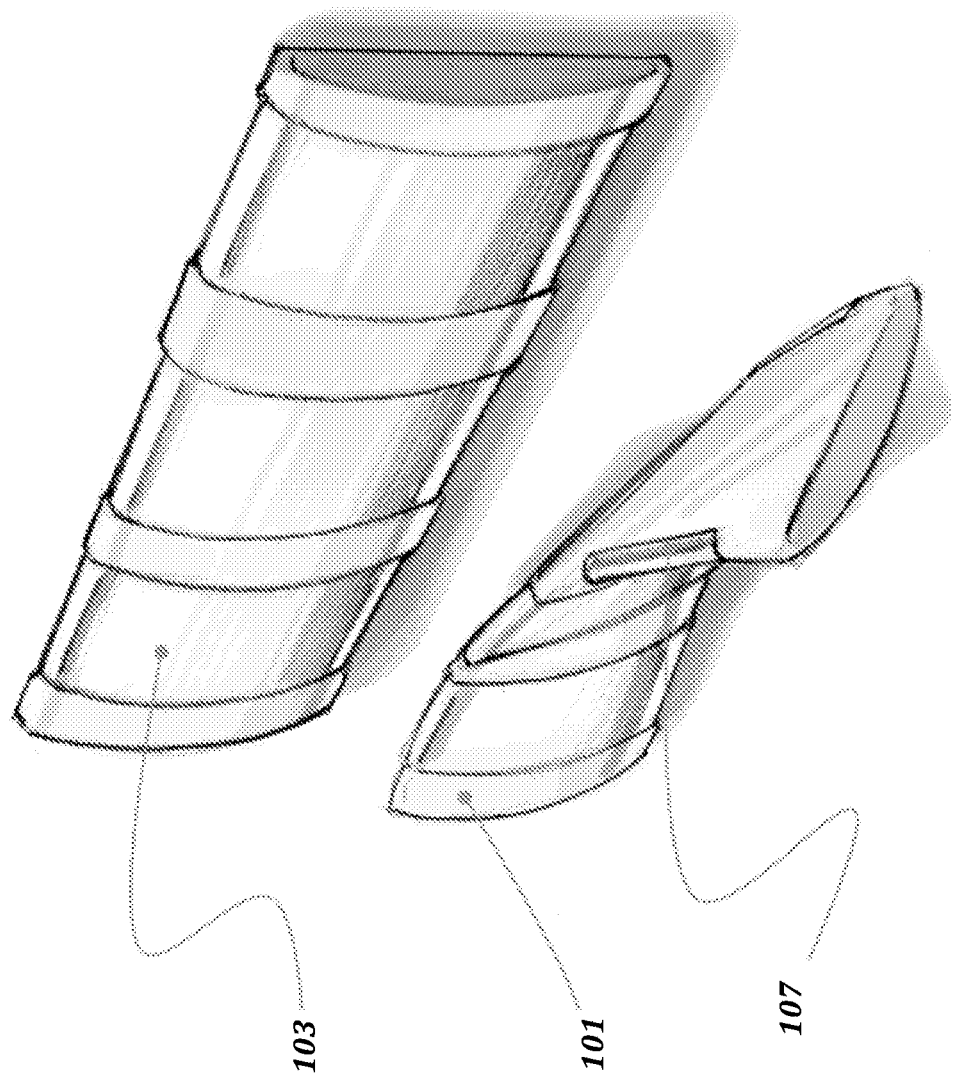
FIG. 9 shows a depiction of a device for securing accessories to a caddy device where the attachment mechanism for the accessory is a plurality steel plates external to the caddy device m accordance with an embodiment of the present disclosure.

FIG. 9 is yet another embodiment of the caddy device 101 consistent with another embodiment of the present disclosure. In this embodiment the attachment mechanism 103 of the caddy device is a plurality of externally detachable steel plates that can be removed for cleaning of the device. The external stainless steel attachment mechanisms 103 may provide sufficient bonding strength to allow the coupling mechanism of the accessory and the attachment mechanism 103 of the caddy device 101 to support the weight of the accessory.

Figure 10:
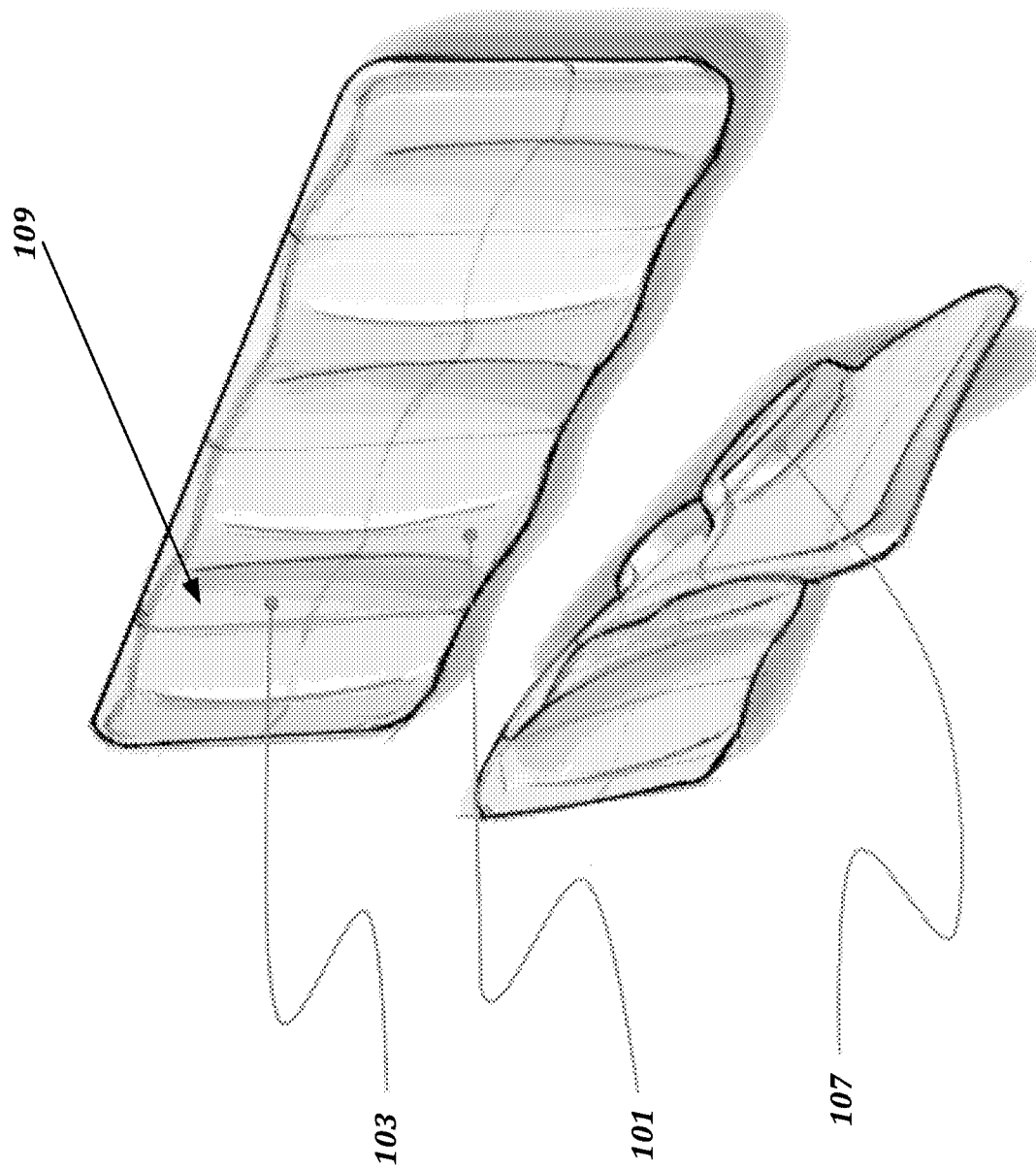
FIG. 10 shows a depiction of a device for securing accessories to a caddy device where the attachment mechanism for the accessory is a plurality embedded within the caddy device and there are concavities to indicate the location of the attachment mechanisms in accordance with an embodiment of the present disclosure.

FIG. 10 is still another embodiment of the caddy device 101 consistent with the present disclosure. The caddy device 101 may be constructed with concavities 109 to indicate the location of attachment mechanism 103 that are embedded within the caddy device. The concavities may further assist in allowing the platform to take up a minimal amount of space in the working environment while still allowing for the containerization of accessories.

Figure 11:
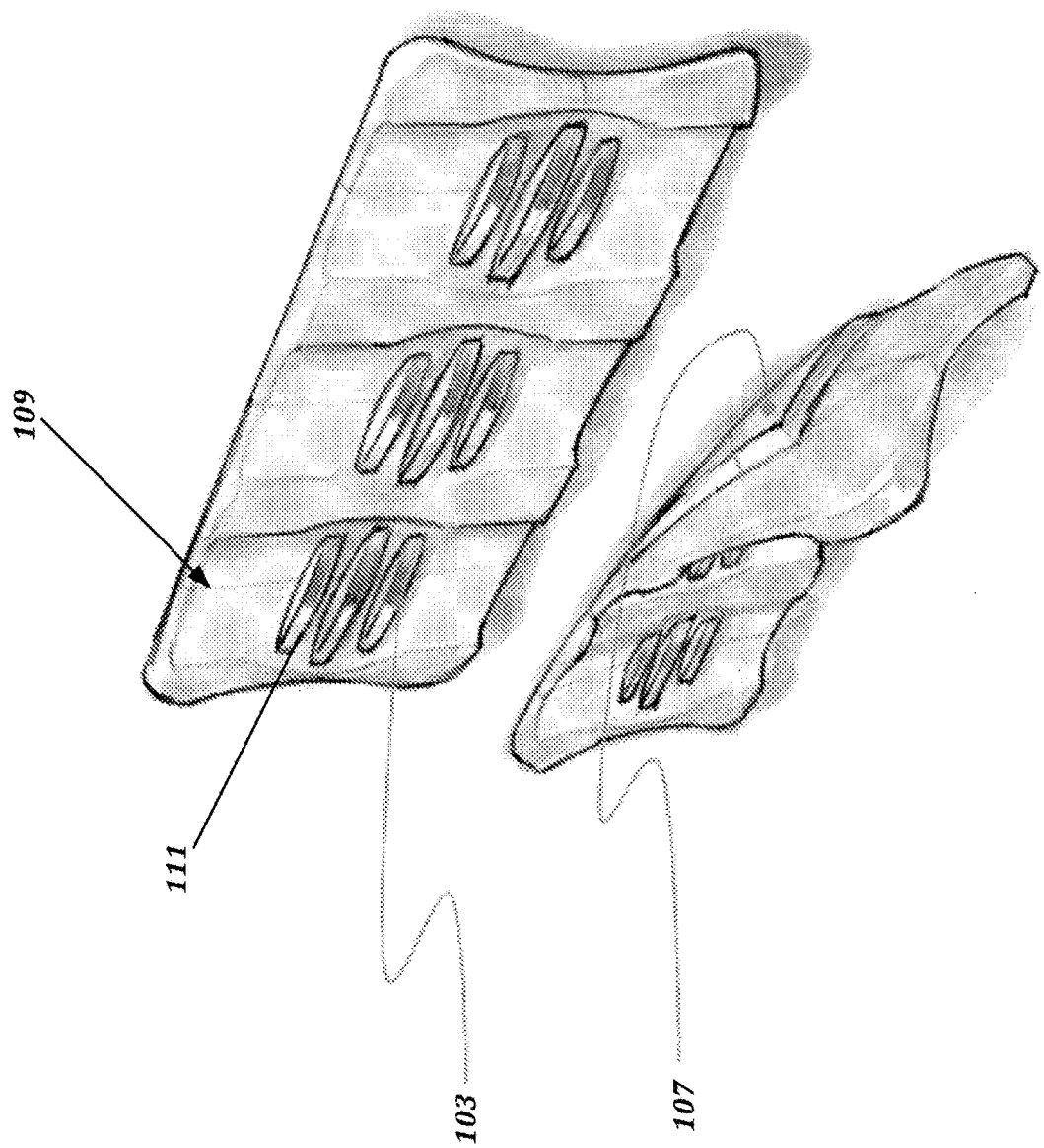
FIG. 11 show depictions of a device for securing accessories to a caddy device where the attachment mechanism for the accessory is a plurality of concavities on the caddy device with external blocks to improve airflow around the attached accessory in accordance with an embodiment of the present disclosure.

FIG. 11 is another embodiment of the caddy device 101 of the present disclosure. The caddy device 101 may comprise concavities 109 with external stainless-steel blocks 111 to allow for the accessory to maintain some separation from the caddy device when it is coupled to the caddy device. The separation of the accessory and the caddy device 101 allows for improved airflow around the accessory resulting in an overall more sanitary system.

Figure 12:
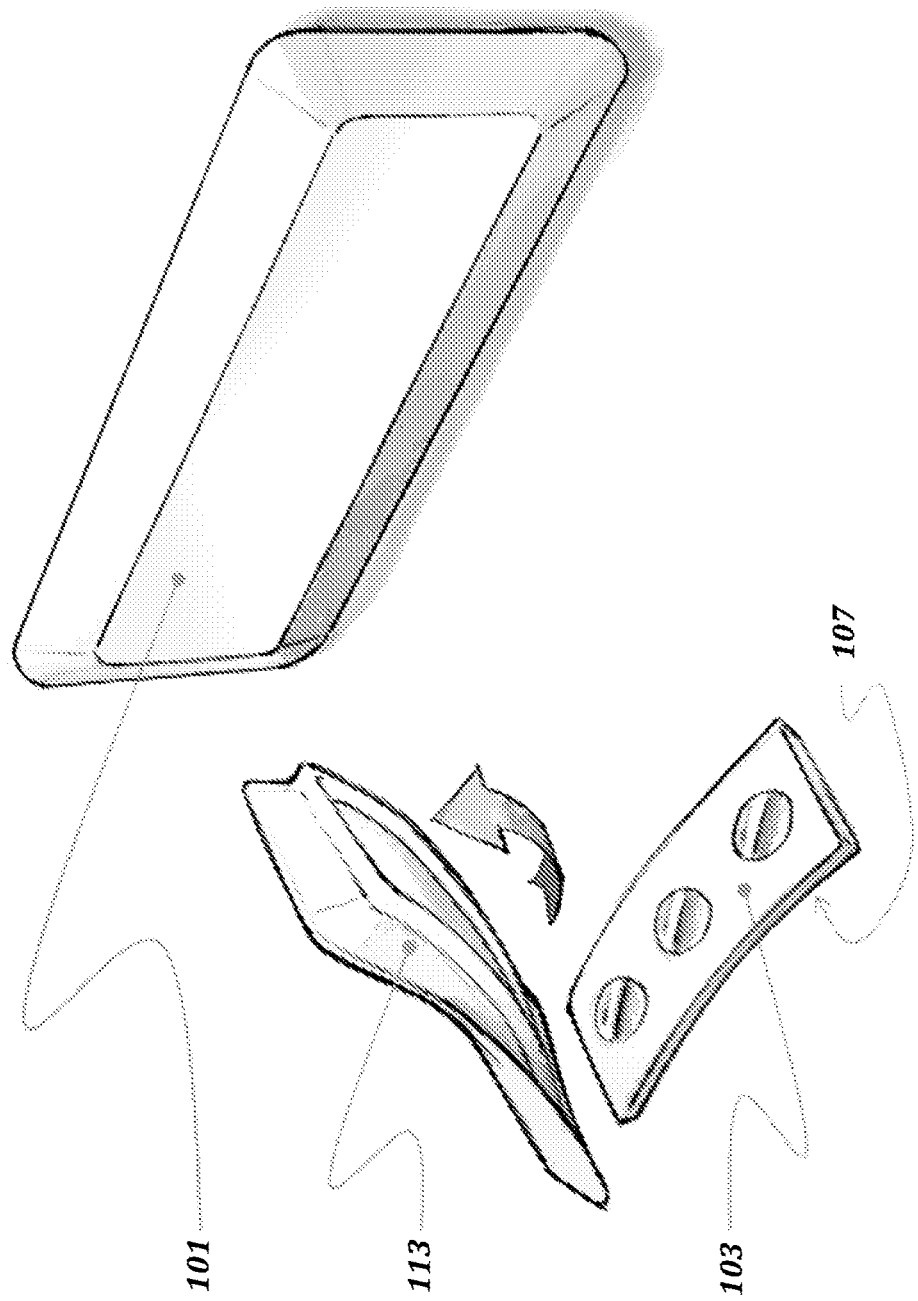
FIG. 12 show depictions of a device where the mounting and attachment mechanisms of the device can be removed from the caddy device and covered by a cover when the device in in use.

FIG. 12 is another embodiment of the present disclosure where the attachment mechanism and mounting mechanism 107 of the caddy can be removed from the caddy device 101 for easier attachment. Once the mounting mechanism 107 has been bonded with the mounting surface the flexible cover 113 of the device 101 can cover the attachment mechanism 103 to protect it from the environment of the caddy device 101.

FIG. 13 is another embodiment of the present disclosure where the accessory device is a sponge 201 with a coupling mechanism 601. The coupling mechanism 601 may be a removeable sealed pouch of neodymium that can be inserted into the sponge accessory 201, or the coupling mechanism 601 of the device may be steel ball bearings embedded within the construction of the caddy device. Accordingly, the plurality of coupling mechanisms can be used to attach the accessory to the caddy device and support the weight of the accessory device.

Figure 14:
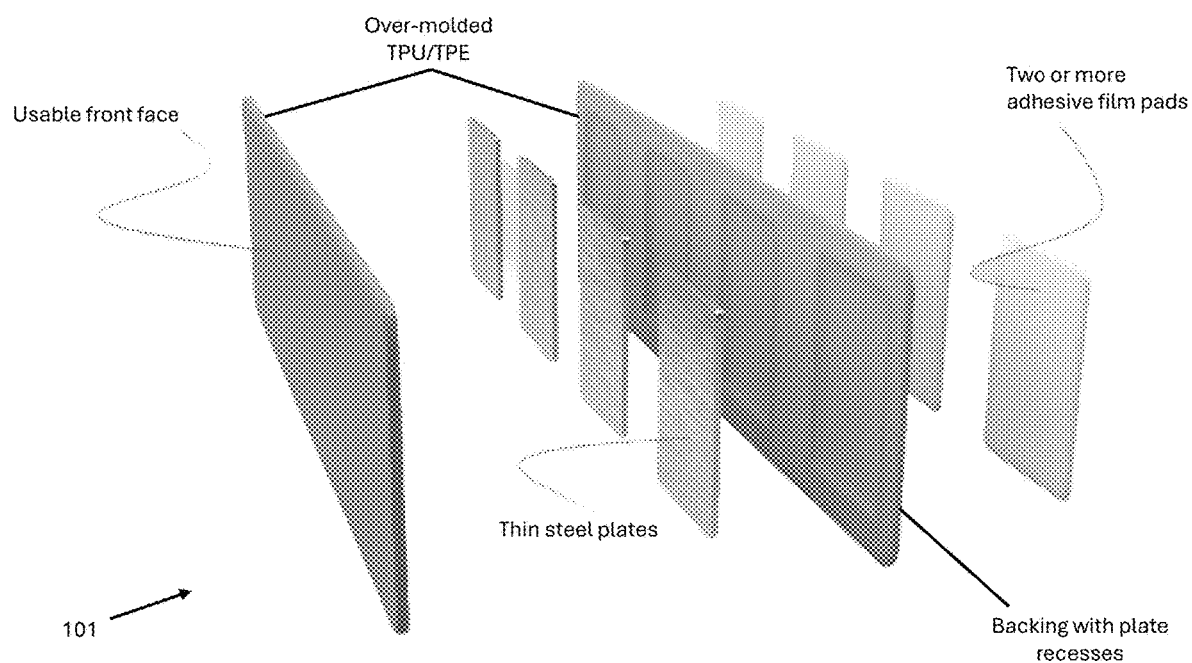
FIG. 14 show an expanded view of an accessory device constructed with over-molders TPU/TPE utilizing recessed thin steel attachment mechanisms and a plurality of adhesive pads to construct the device in accordance with an embodiment of the present disclosure, constructed in such a way to minimize the space it takes up in a work area in accordance with an embodiment of the present disclosure.

FIG. 14 is another embodiment of the caddy device 101 of the present disclosure. The caddy device 101 may comprise a casing 115 with concavities 117 for thin steel plates 105 to allow for accessory attachment, where the front face 119 is smooth and the rear face 121 includes a mounting mechanism 107 comprising 4 replaceable adhesive film pads for mounting.

D. Device and System Operation and Methods for Using Same

Also disclosed herein are methods of making and using the disclosed devices, apparatuses, and systems. For example, in another exemplary aspect, the present disclosure provides a method for detachable mounting of a kitchen or bath accessory to a mounting surface using a disclosed caddy device or system (e.g., the caddy device 101). In further aspects, the caddy device may be removably mounted to a mounting surface, such as a sink wall.

One method may begin with the caddy device being initially attached to the mounting surface using the mounting mechanism (e.g., the mounting mechanism 107). Once the mounting mechanism, whether it be magnetic, adhesive, or physical bonding has been mounted to the mounting surface, the caddy device is properly oriented for the use of the accessory attachment mechanisms (e.g., the accessory attachment mechanisms 103) of the specific caddy configuration. With the caddy device successfully bonded to the mounting surface, such as the sink wall, and the attachment mechanisms oriented in such a way as to allow for the accessories to detachably couple with them, the accessories may then be attached to the caddy device. The accessories may be attached to the caddy device in such a way that it minimizes the space required to containerize the accessories within the work environment. When the accessories are needed to complete a task, they can be detachably removed from the caddy device without removing the caddy device from the mounting surface and reattached when the task has been finished.

Another method of use for the configurable mounting system comprises attaching the system to an attachment surface. The system will first attach to a device by, for example, elastically changing the shape of the system. As the system changes shape it may then deform enough to surround at least a portion of the object. The system may then attempt to return to the original shape of the shape and thereby become detachably connected to the object for at least, as a non-limiting example, friction or other physical force between the system and the object. The system may then advance to detachably connecting to the attachment surface. In various embodiments, the system may connect to the attachment surface resulting from the attachment surface and the system coming into contact. Once the system has detachably connected to the attachment surface the system may then be able to support the object attached to the system continuously until the system is removed from the surface. Accordingly the system can be used to attach a tool to a surface that it would otherwise be unable to attach to, for example, a plastic kitchen accessory attaching to a magnetic kitchen caddy.

The present invention includes as least the following aspects: Aspect 1: A detachable accessory system comprising: a caddy device for detachably coupling at least one accessory; and at least one accessory configured to detachably couple to the caddy device. Aspect 2: A caddy device for coupling one or more accessories, the device comprising: a caddy device assembly; a mounting mechanism for attaching the caddy device to a mounting surface; and a coupling mechanism configured to attach one or more accessories to the caddy device.

Aspect 3: The device or system of aspect 1 or 2, further comprising an accessory configured to detachably attach to a surface of the caddy device. Aspect 4: The device or system of any preceding aspect, wherein the accessory configured to detachably attach to a magnetic mounting surface. Aspect 5: The device or system of any preceding aspect, wherein the accessory comprises a kitchen accessory. Aspect 6: The device or system of any preceding aspect, wherein the accessory comprises a bathroom accessory. Aspect 7: The device or system of any preceding aspect, wherein the accessory comprises a tool. Aspect 8: The device or system of any preceding aspect, wherein the accessory comprises an external material that cannot be attached to the caddy device. Aspect 9: The device or system of any preceding aspect, wherein the caddy device can be used to hold other tools not inherently able to attach to the caddy device. Aspect 10: The device or system of any preceding aspect, wherein the accessory comprises a magnetic sponge or a magnetic brush, or a combination thereof. Aspect 11: The device of any preceding aspect, wherein the caddy device comprises a caddy device assembly or caddy device body. Aspect 12: The device of any preceding aspect, wherein the caddy device assembly is configured to be vertically mounted or horizontally mounted.

Aspect 13: The device of any preceding aspect, wherein the device may be made from a plurality of materials such as silicone, plastic, antimicrobial material, film. Aspect 14: The device or system of any preceding aspect, wherein the caddy device would have attachment points for the accessory device. Aspect 15: The device or system of any preceding aspect, wherein the cady device has attachment properties not present in the surrounding surface. Aspect 16: The device or system of any preceding aspect, wherein the caddy device is slender in construction. Aspect 17: The device or system of any preceding aspect, wherein the caddy device is flexible in construction. Aspect 18: The device or system of any preceding aspect, wherein the caddy device is made of a material that will not degrade over time due to exposure. Aspect 19: The device of any preceding aspect, wherein the device is flexible. Aspect 20: The device or system of any preceding aspect, wherein the device is made of a flexible material. Aspect 21: The device or system of any preceding aspect, wherein the accessory attachment mechanism does not interfere with the flexibility of the caddy device. Aspect 22: The device or system of any preceding aspect, wherein the caddy device is puncture resistant from any accessory attachment mechanism. Aspect 23: The device or system of any preceding aspect, further comprising an attachment mechanism on the caddy device. Aspect 24: The device or system of any preceding aspect, wherein the attachment mechanism can support the weight of the accessory. Aspect 25: The device or system of any preceding aspect, wherein the attachment mechanism is distributed throughout or substantially throughout the entirety of the caddy device. Aspect 26: The device or system of any preceding aspect, wherein the attachment mechanism is only located at finite areas of the caddy device. Aspect 27: The device or system of any preceding aspect, wherein the attachment mechanism uses a magnetic force. Aspect 28: The device or system of any preceding aspect, wherein the attachment mechanism utilizes adhesive means. Aspect 29: The device or system of any preceding aspect, wherein the attachment mechanism uses the same means of attaching as the caddy uses to attach to the surrounding surface. Aspect 30: The device or system of any preceding aspect, wherein the attachment mechanism is externally exposed on the caddy device.

Aspect 31: The device or system of any preceding aspect, further comprising an attachment device exposed externally on the device. Aspect 32: The device or system of any preceding aspect, wherein the external attachment device does not interfere with the mounting capabilities of the device. Aspect 33: The device or system of any preceding aspect, wherein the external attachment device covers the entirety of the caddy device. Aspect 34: The device or system of any preceding aspect, wherein the external attachment device. Aspect 35: The device or system of any preceding aspect, wherein further comprising concavities for the placement of accessory devices. Aspect 36: The device or system of any preceding aspect, wherein the concavities correspond to the attachment mechanism for the accessory. Aspect 37: The device or system of any preceding aspect, wherein the concavities allow the accessories to take up less space overall. Aspect 38: The device or system of any preceding aspect, wherein the concavities allow the accessories to attach more easily to the caddy device. Aspect 39: The device or system of any preceding aspect, wherein further comprising a caddy device that can be utilized with a plurality of attachment mechanisms. Aspect 40: The device or system of any preceding aspect, wherein a plurality of attachment mechanisms can be paired with the caddy device. Aspect 41: The device or system of any preceding aspect, wherein different attachment mechanisms are best suited for specific environments. Aspect 42: The device or system of any preceding aspect, wherein further comprising one face of the device having an attachment mechanism. Aspect 43: The device or system of any preceding aspect, wherein the face having the attachment mechanism may be an integral part of the device. Aspect 44: The device or system of any preceding aspect, wherein the face having the attachment mechanism allows for the replacement of the attachment mechanism used in the device. Aspect 45: The device or system of any preceding aspect, further comprising an embedded attachment mechanism. Aspect 46: The device or system of any preceding aspect, wherein the embedded attachment mechanism does not hinder the ability for accessories to attach to the device. Aspect 47: The device or system of any preceding aspect, wherein the embedded attachment mechanism is shielded from the surrounding environment. Aspect 48: The device or system of any preceding aspect, further comprising a mounting mechanism to attach the mechanism to a mounting surface. Aspect 49: The device or system of any preceding aspect, wherein the mounting surface may comprise a horizontal surface. Aspect 50: The device or system of any preceding aspect, wherein the mounting mechanism can be accomplished using physical means. Aspect 51: The device or system of any preceding aspect, wherein the mounting surface may comprise a vertical surface. Aspect 52: The device or system of any preceding aspect, wherein the mounting surface may comprise a wall or sink material. Aspect 53: The device or system of any preceding aspect, wherein the mounting mechanism comprises: a Designer suction cup, Microsuction tape, GECKSHIN, Removable VHB, Dual lock tape, Magnetic Anchor, Tacky Vacuum Membrane, Thin film, Plastic-like thin film, or combinations thereof. Aspect 54: The device or system of any preceding aspect, wherein the mounting mechanism is stronger than the attachment mechanisms of the device. Aspect 55: The device or system of any preceding aspect, further comprising a horizontal mounting mechanism. Aspect 56: The device or system of any preceding aspect, wherein the horizontal mounting mechanism prevents the device from sliding along the surface. Aspect 57: The device or system of any preceding aspect, wherein the horizontal mounting mechanism relies on bonding rather than high friction to remain attached to the surface. Aspect 58: The device or system of any preceding aspect, wherein the horizontal mounting mechanism is integrated into the design of the device. Aspect 59: The device or system of any preceding aspect, wherein the bonding strength of the horizontal mounting mechanism can be retained when used vertically.

Aspect 60: The device or system of any preceding aspect, wherein the mounting mechanism can be reusable. Aspect 61: The device or system of any preceding aspect, wherein further comprising a vertical mounting mechanism. Aspect 62: The device or system of any preceding aspect, wherein the vertical mounting mechanism can support the weight of any accessories attached to the device. Aspect 63: The device or system of any preceding aspect, wherein the vertical mounting mechanism can retain some bonding capabilities in different orientations. Aspect 64: The device or system of any preceding aspect, further comprising the ability for the accessory to attach to the mounting surface. Aspect 65: The device or system of any preceding aspect, wherein the coupling mechanism of the accessory uses the same mechanism as the attachment mechanism. Aspect 66: The device or system of any preceding aspect, wherein the coupling mechanism is magnetic. Aspect 67: The device or system of any preceding aspect, wherein the coupling mechanism can repeatedly attach to the coupling surface. Aspect 68: The device or system of any preceding aspect, wherein the coupling mechanism is not externally exposed on the accessory device. Aspect 69: The device or system of any preceding aspect, further comprising a magnetic coupling mechanism. Aspect 70: The device or system of any preceding aspect, wherein the magnetic coupling mechanism is distributed throughout or substantially throughout the accessory device. Aspect 71: The device or system of any preceding aspect, wherein the magnetic coupling mechanism is strong enough to support the weight of the accessory through the surrounding body of the accessory. Aspect 72: The device or system of any preceding aspect, further comprising an accessory capable of attaching to the device. Aspect 73: The device or system of any preceding aspect, wherein the accessory has a component that corresponds to the caddy for coupling. Aspect 74: The device or system of any preceding aspect, wherein the device retains its adhesive properties after repeated use. Aspect 75: The device or system of any preceding aspect, wherein the accessory device has a specific point to attach to the device. Aspect 76: The device or system of any preceding aspect, wherein the accessory can repeatedly attach to the device. Aspect 77: The device or system of any preceding aspect, wherein the accessory can attach to the device using an internal (embedded) mechanism. Aspect 78: The device or system of any preceding aspect, wherein the accessory can attach to the device by external means. Aspect 79: The device or system of any preceding aspect, wherein the accessory can better attach to the caddy device compared to the surrounding surface. Aspect 80: The device or system of any preceding aspect, further comprising a sponge. Aspect 81: The device or system of any preceding aspect, wherein the sponge is magnetic. Aspect 82: The device or system of any preceding aspect, wherein the sponge is not magnetic but has a cavity or pocket for a magnet to be inserted into the sponge. Aspect 83: The device or system of any preceding aspect, wherein the sponge uses a different material for the internal lining. Aspect 84: The device or system of any preceding aspect, wherein the attachment mechanism used to attach the sponge to the device is removable. Aspect 85: The device or system of any preceding aspect, wherein the sponge is embedded with a magnetic material. Aspect 86: The device or system of any preceding aspect, further comprising a brush. Aspect 87: The device or system of any preceding aspect, wherein the brush is attached so no moment arm of the brush exceeds the attachment strength of the brush to the device. Aspect 88: The device or system of any preceding aspect, wherein the brush has an internal mechanism to attach to the device. Aspect 89: The device or system of any preceding aspect, further comprising an accessory that can have additional tools attached to it that would not otherwise be able to attach to the device. Aspect 90: The device or system of any preceding aspect, wherein the accessory can be a soap dish, a tray, a hook, or combinations thereof. Aspect 91: The device or system of any preceding aspect, wherein the accessory of any preceding aspect, has improved functionally as a result of being attached to the device. Aspect 92: The device or system of any preceding aspect, wherein the device may be more sanitary than conventional caddy devices. Aspect 93: The device or system of any preceding aspect, wherein the device may promote better airflow than conventional caddy devices. Aspect 94: The device or system of any preceding aspect, further comprising a reusable mounting mechanism. Aspect 95: The device or system of any preceding aspect, wherein the mounting reusable mounting mechanism does not lose any significant amount of adhesion from prolonged use of the device. Aspect 96: The device or system of any preceding aspect, wherein the coupling mechanism is magnetic. Aspect 97: The device or system of any preceding aspect, wherein the attachment system is repeatedly able to attach and detach from the mounting surface. Aspect 98: The device or system of any preceding aspect, wherein the device is configured to be compact in design. Aspect 99: The device or system of any preceding aspect, the device or system of any preceding aspect, further comprising a removable mounting mechanism. Aspect 100: The device or system of preceding aspect, wherein the mounting mechanism can be removed for cleaning. Aspect 101: The device or system of preceding aspect, wherein the mounting mechanism can be removed from the device for easier mounting. Aspect 102: The device or system of preceding aspect, wherein the mounting mechanism can be removed from the device for replacement. Aspect 103: The device or system of any preceding aspect, further comprising a water-resistant exterior. Aspect 104: The device or system of preceding aspect, wherein the water-resistant exterior can be a coating. Aspect 105: The device or system of preceding aspect, wherein the water-resistant exterior can be caused by the material used to construct the device. Aspect 106: The device or system of any preceding aspect, further comprising anti-microbial properties. Aspect 107: The device or system of preceding aspect, wherein the device has antimicrobial coatings. Aspect 108: The device or system of preceding aspect, wherein the antimicrobial properties are wholly integrated into the device or accessory. Aspect 109: The device or system of preceding aspect, wherein the antimicrobial coatings are an external barrier. Aspect 110: The device or system of any preceding aspect, further comprising a magnetic attachment mechanism. Aspect 111: The device or system of any preceding aspect, wherein the magnetic attachment mechanism is a rare-earth magnet, a thin ferrous material, magnetic ceramic, or combination thereof. Aspect 112: The device or system of any preceding aspect, wherein the magnetic material is resistant to oxidation. Aspect 113: The device or system of any preceding aspect, further comprising a magnetic surface treatment for a mounting surface for attaching the caddy device. Aspect 114: The device or system of any preceding aspect, wherein the magnetic surface treatment is a magnetic film, coating, covering or tape. Aspect 115: The device or system of any preceding aspect, wherein the magnetic surface treatment is configured to allow the caddy device to releasably couple thereto. Aspect 116: The device or system of preceding aspect, wherein the external surface of the magnetic surface treatment is non-abrasive, non-skid, or waterproof, resistant to oxidation, or a combination thereof. Aspect 117: The device or system of any preceding aspect, further comprising a device attachment mechanism and a caddy attachment mechanism. Aspect 118: The device or system of any preceding aspect, wherein the device attachment mechanism is constructed to universally attach to a kitchen device. Aspect 119: The device or system of any preceding aspect, wherein the device attachment mechanism is detachably connectable to a kitchen device. Aspect 120: The device or system of any preceding aspect, wherein the device attachment mechanism can be temporarily attached to the kitchen device. Aspect 121: The device or system of any preceding aspect, wherein the device attachment mechanism construction comprises an elastic, polymer, plastic, or other non-reactive material.

Aspect 122: The device or system of any preceding aspect, wherein the material that will not physically or chemically interfere with the caddy device mechanism or the kitchen device. Aspect 123: The device or system of any preceding aspect, wherein the device attachment mechanism is elliptical or circular in shape. Aspect 124: The device or system of any preceding aspect, wherein the device is configured to attach to stretch to expand beyond the size of the original construction. Aspect 125: The device or system of any preceding aspect, wherein the device is constructed from elastic material. Aspect 126: The device or system of any preceding aspect, wherein the device contains magnetic properties independently from the size of the device. Aspect 127: The device or system of any preceding aspect, wherein the magnet is embedded within a silicone ring. Aspect 128: The device or system of any preceding aspect, wherein the device attachment mechanism is made of silicone. Aspect 129: The device or system of any preceding aspect, wherein the caddy attachment mechanism is a magnet. Aspect 130: The device or system of any preceding aspect, wherein the magnet is a magnetic band, magnetic pin, or magnetic additive that can be incorporated into the device attachment mechanism. Aspect 131: The device or system of any preceding aspect, wherein the device attachment mechanism can attach to accessories that would otherwise not contain magnetic properties. Aspect 132: The device or system of any preceding aspect, wherein the caddy attachment mechanism further comprises a temporary magnet or permanent magnet. Aspect 133: The device or system of any preceding aspect, wherein the caddy attachment mechanism can retain magnetic properties as the device attachment mechanism changes shape. Aspect 134: The device or system of any preceding aspect, wherein the device attachment mechanism returns to the original shape of the device attachment mechanism after it has been detached from the object. Aspect 135: The device or system of any preceding aspect, wherein the device attachment mechanism does not interfere with the strength of the caddy attachment mechanism. Aspect 136: The device or system of any preceding aspect, wherein the device attachment mechanism is a metallic strip. Aspect 137: The device or system of any preceding aspect, wherein the caddy attachment mechanism is ferromagnetic. Aspect 138: The device or system of any preceding aspect, wherein the caddy attachment mechanism comprises a ceramic strip with ferromagnetic properties. Aspect 139: The device or system of any preceding aspect, wherein the device attachment mechanism envelops the caddy attachment mechanism. Aspect 140: The device or system of any preceding aspect, wherein the caddy attachment mechanism is not exposed to the surrounding environment due to the device attachment mechanism. Aspect 141: The device or system of any preceding aspect, wherein the caddy attachment mechanism is located on an external portion of the device attachment mechanism. Aspect 142: The device or system of any preceding aspect, wherein the caddy attachment mechanism provides can detachably connect to the kitchen caddy device. Aspect 143: The device or system of any preceding aspect, wherein the caddy attachment mechanism is distributed throughout the entire device attachment mechanism. Aspect 144: The device or system of any preceding aspect, wherein the caddy attachment mechanism comprises a plurality of caddy attachment elements. Aspect 145: The device or system of any preceding aspect, wherein the wherein the plurality of caddy attachment elements. Aspect 146: The device or system of any preceding aspect, wherein the device attachment mechanism comprises antibacterial material. Aspect 147: The device or system of any preceding aspect, wherein the caddy attachment mechanism is water resistant. Aspect 148: The device or system of any preceding aspect, wherein the device attachment mechanism is configured to detachably connect to a kitchen caddy device. Aspect 149: The device or system of any preceding aspect, wherein the device is configured to detachably connect to a tool, kitchen implement, or other handheld device. Aspect 150: The device or system of any preceding aspect, wherein the device attachment mechanism is configured to secure to a non-magnetic device. Aspect 151: The device or system of any preceding aspect, wherein the device attachment mechanism can support the weight of the device it is attached to. Aspect 152: The device or system of any preceding aspect, wherein the caddy attachment mechanism generates a strong enough force between the caddy attachment mechanism and the caddy device that it can support the device attached to the device attachment mechanism. Aspect 153: The device or system of any preceding aspect, wherein the caddy attachment mechanism maintains a high coefficient of friction between the attachment device and the caddy attachment mechanism. Aspect 154: The device or system of any preceding aspect, wherein the device attachment mechanism maintains a high coefficient of friction between the object and the device attachment mechanism. Aspect 155: The device or system of any preceding aspect, wherein the device is dishwasher safe. Aspect 156: The device or system of any preceding aspect, wherein the device can be used in high temperature environments. Aspect 157: The device or system of any preceding aspect, wherein the device is resistant to cold environments. Aspect 158: The device or system of any preceding aspect, wherein the device is not easily cut. Aspect 159: The device or system of any preceding aspect, wherein the device retains the original shape of the device after being attached to an object for a period of time. Aspect 160: The device or system of any preceding aspect, wherein the device provides enhanced attachment properties between the object and the caddy device. Aspect 161: The device or system of any preceding aspect, wherein the caddy attachment mechanism is only attachable to the caddy device. Aspect 162: The device or system of any preceding aspect, wherein the device forms a magnetic ring. Aspect 163: The device or system of any preceding aspect, wherein the device is configured to attach to a caddy device. Aspect 164: The device or system of any preceding aspect, wherein the device is secured to an object by friction. Aspect 165: The device or system of any preceding aspect, wherein the system is configured to detachably connect to an attachment surface. Aspect 166: The device or system of any preceding aspect, wherein the system can detachably connect to a sink.

Aspect 167: A method for detachably attaching an accessory within a sink, the method comprising: mounting a caddy device to a vertical wall of a sink; and detachably coupling a magnetically responsive sink accessory to the device caddy. Aspect 168: The method of any previous aspect, wherein the device caddy is mounted to an outside surface of the sink wall. Aspect 169: The method of any preceding aspect; wherein the sink accessory is directly attached to an inside surface of the sink wall. Aspect 170: The method of any preceding aspect; wherein the caddy device comprises the caddy device of any preceding aspect.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A caddy device for coupling one or more accessories, the device comprising:
   a base station comprising a first side configured to be mounted onto an external surface, the base station comprising:
   a base station surface extending along substantially the entirety of a second side of the base station, the second side of the base station opposing the first side of the base station, the base station surface comprising:
      a first antimicrobial material; and
      a first magnetic material comprising one or more magnets embedded within the antimicrobial material, the one or more magnets positioned to permit attachment of a sponge to the second side of the base station;
   a sponge configured to be releasably attached to the base station surface of the base station, the sponge comprising:
      a second magnetic material formed within a first sponge surface extending along substantially the entirety of a first side of the sponge, wherein the second magnetic material magnetically couples with the one or more magnets; and a second sponge surface extending along substantially the entirety of a second side of the sponge, the second side opposing the first side, the second sponge surface comprising a nonmagnetic material; and a brush attachment configured to be releasably attached to the first surface of the base station, the brush attachment comprising a third magnetic material.

2. The device of claim 1, wherein the second magnetic material does not comprise a magnet.

3. The device of claim 1, wherein the one or more magnets comprises a plurality of magnets distributed throughout the base station surface.

4. The device of claim 1, wherein the second magnetic material comprises a magnetic surface treatment, rare-earth magnet, a thin ferrous material, magnetic ceramic, or combination thereof.

5. The device of claim 1, further comprising at least one of a kitchen accessory, a bathroom accessory, and a tool, each comprising another magnetic material.

6. The device of claim 1, wherein the sponge is generally square shaped with convex edges, wherein a seam separates the first sponge surface from the second sponge surface, wherein the seam is contiguous with the convex edges.

7. The device of claim 1, wherein the base station is configured to be mounted to the external surface via a magnetic anchor.

8. The device of claim 1, wherein the base station is configured to be mounted to the external surface via an adhesive.

9. The device of claim 1, wherein the base station is configured to be mounted to an inside or an outside surface of a sink.

10. The device of claim 1, wherein the the first sponge surface comprises a rough texture.

11. The device of claim 1, wherein the antimicrobial material comprises one or more of silicon or thermoplastic polyurethane (TPU).

12. The device of claim 1, wherein the base station is flexible.

13. The device of claim 1, further comprising at least one concavity formed in the base station surface, wherein the at least one concavity is positioned adjacent the first magnetic material.

14. The device of claim 1, further comprising at least one spacer formed in the base station, the at least one spacer configured to promote airflow between the base station and the sponge.

15. The device of claim 1, wherein the base station is rectangular in shape.

16. The device of claim 1, wherein at least one of the base station and the sponge is dishwasher safe.

17. The device of claim 1, wherein the sponge is water resistant.

18. The device of claim 1, wherein the sponge comprises a second antimicrobial material.

19. The device of claim 18, wherein the first and the second antimicrobial materials are different materials.

* * * * *